(12) United States Patent
Tamura et al.

(10) Patent No.: US 8,272,267 B2
(45) Date of Patent: Sep. 25, 2012

(54) ANGULAR VELOCITY SENSOR

(75) Inventors: Masaya Tamura, Sagamihara (JP); Yoichi Mochida, Yasu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 280 days.

(21) Appl. No.: 12/830,515

(22) Filed: Jul. 6, 2010

(65) Prior Publication Data

US 2010/0263446 A1 Oct. 21, 2010

(30) Foreign Application Priority Data

Jan. 7, 2008 (JP) .................................. 2008-000567
Oct. 14, 2008 (JP) .................................. 2008-265490

(51) Int. Cl.
*G01C 19/56* (2006.01)
(52) U.S. Cl. ................................. 73/504.12; 73/504.14
(58) Field of Classification Search ............... 73/504.12, 73/504.04, 504.14, 504.15, 504.02
See application file for complete search history.

(56) References Cited

U.S. PATENT DOCUMENTS

| | | | |
|---|---|---|---|
| 5,203,208 A | 4/1993 | Bernstein | |
| 5,992,233 A | 11/1999 | Clark | |
| 6,158,280 A | 12/2000 | Nonomura et al. | |
| 2006/0112764 A1* | 6/2006 | Higuchi | 73/504.12 |
| 2006/0156812 A1* | 7/2006 | Kai-Cheng et al. | 73/504.12 |
| 2008/0276706 A1 | 11/2008 | Hartmann et al. | |
| 2010/0101323 A1* | 4/2010 | Kohn | 73/504.12 |
| 2010/0126272 A1* | 5/2010 | Coronato et al. | 73/504.14 |
| 2010/0236327 A1* | 9/2010 | Mao | 73/504.12 |
| 2011/0030473 A1* | 2/2011 | Acar | 73/504.12 |
| 2011/0061460 A1* | 3/2011 | Seeger et al. | 73/504.12 |
| 2011/0154898 A1* | 6/2011 | Cazzaniga et al. | 73/504.12 |

FOREIGN PATENT DOCUMENTS

| | | |
|---|---|---|
| GB | 2 335 273 A | 9/1999 |
| JP | 10-239347 A | 9/1998 |
| JP | 11-183179 A | 7/1999 |
| JP | 2000-9471 A | 1/2000 |
| JP | 2002-509615 A | 3/2002 |
| JP | 2002-213962 A | 7/2002 |
| JP | 2005-241500 A | 9/2005 |
| JP | 2006-138855 A | 6/2006 |
| WO | 97/45699 A2 | 12/1997 |
| WO | 99/19689 A1 | 4/1999 |
| WO | 2006/034706 A1 | 4/2006 |

OTHER PUBLICATIONS

Official Communication issued in International Patent Application No. PCT/JP2008/072656, mailed on Mar. 17, 2009.

* cited by examiner

*Primary Examiner* — Helen C. Kwok
(74) *Attorney, Agent, or Firm* — Keating & Bennett, LLP

(57) ABSTRACT

In an angular velocity sensor, driven mass portions are disposed on a surface of a base plate at point-symmetrical locations with respect to a central point O. The driven mass portions are connected to a coupling beam to be interconnected. The coupling beam is flexibly supported through connecting portions and driven beam. Detecting mass portions are disposed inside the driven mass portions, and the detecting mass portions are supported by detecting beams to be displaceable in the Z-axis direction. Two adjacent ones of the driven mass portions in the circumferential direction are vibrated by vibration generation portions in opposite phases to each other. When angular velocities are exerted in such a state, the detecting mass portions are caused to displace and vibrate in the direction of thickness of the base plate. Displacement detecting portions detect displacements of the detecting mass portions in the direction of the thickness.

8 Claims, 20 Drawing Sheets

ANGULAR VELOCITY SENSOR

BACKGROUND OF THE INVENTION

1. Field of the Invention

The present invention relates to an angular velocity sensor that is used to detect angular velocities in two-axis directions, for example.

2. Description of the Related Art

In general, a known angular velocity sensor includes a plurality of mass portions provided on a substrate. Japanese Unexamined Patent Application Publication No. 11-183179 and Japanese Unexamined Patent Application Publication No. 2006-138855 disclose an arrangement in which four mass portions are provided on the substrate along a circumference thereof and two adjacent mass portions in the circumferential direction are vibrated in directions opposite to each other. In such an arrangement, when an angular velocity about each of two axes is exerted on the substrate parallel to the surface of the substrate in a state in which the four mass portions are vibrated, the four mass portions are displaced in the vertical direction (i.e., the direction of thickness of the substrate) by the action of Coriolis forces. Thus, the angular velocity sensors disclosed in Japanese Unexamined Patent Application Publication No. 11-183179 and Japanese Unexamined Patent Application Publication No. 2006-138855 detect the angular velocities about the two axes by detecting the displacements of the four mass portions in the vertical direction.

Japanese Unexamined Patent Application Publication No. 2002-213962 discloses an arrangement in which a plurality of mass portions are arranged on a substrate side by side in the direction of a Y-axis and the plurality of mass portions are vibrated in the direction of an X-axis perpendicular to the Y-axis. The angular velocity sensor disclosed in Japanese Unexamined Patent Application Publication No. 2002-213962 detects an angular velocity about the Y-axis and an angular velocity about a Z-axis by detecting the displacements of the mass portions in the vertical direction of the substrate (i.e., the Z-axis direction) and in the Y-axis direction in a state where the plurality of mass portions are vibrated.

Japanese Unexamined Patent Application Publication No. 2002-509615 discloses an arrangement in which a substrate is disposed parallel to an XY-plane, a plurality of support legs each extending in a spiral shape from a support portion on the substrate are provided, and a ring-shaped vibrator is circumferentially provided at a distal end of each of the support legs. In such an arrangement, an angular velocity about an X-axis and an angular velocity about a Y-axis are detected by deforming and vibrating the ring-shaped vibrator in the XY-plane in a predetermined vibration mode and by detecting the displacement of the ring-shaped vibrator in the Z-axis direction (i.e., the vertical direction of the substrate).

The angular velocity sensors disclosed in Japanese Unexamined Patent Application Publication No. 11-183179 and Japanese Unexamined Patent Application Publication No. 2006-138855 are constructed so as to suppress the vibrations from leaking to the substrate by using the four mass portions in a combined manner. However, the amplitudes in the four mass portions need to be matched with each other in order to prevent a leak of the vibrations. In the angular velocity sensors disclosed in Japanese Unexamined Patent Application Publication No. 11-183179 and Japanese Unexamined Patent Application Publication No. 2006-138855, the four mass portions are supported so as to be able to vibrate using independent springs. Therefore, if manufacturing variations occur in the mass portions and the springs, a large difference in vibrations is generated among the mass portions when the mass portions are vibrated in a resonance state. This leads to a tendency for the vibrations of the mass portions to leak to the substrate, thus causing problems, such as fluctuations of an offset and an increase of noise, as the temperature changes. Further, because the four mass portions vibrate at different amplitudes, the Coriolis forces generated due to the angular velocities also differ from each other and the sensitivity varies between two modes of detections with respect to the two axes.

In the angular velocity sensors disclosed in Japanese Unexamined Patent Application Publication No. 11-183179 and Japanese Unexamined Patent Application Publication No. 2006-138855, particularly, the mass portions are supported in a state in which the springs are displaceable in both in the driving direction and the detecting direction. Therefore, coupling occurs between the vibration having been driven and the vibration to be detected, which increases the influence of a leak of the vibrations.

In the angular velocity sensor disclosed in Japanese Unexamined Patent Application Publication No. 2002-213962, a spring being subjected to the driven vibration and a spring being subjected to the detected vibration are provided independently of each another so that the coupling between the driven vibration and the detected vibration does not substantially occur. However, the disclosed angular velocity sensor is not suitable for specifications that are demanded in some practical applications because it does not detect the angular velocities about the two axes (i.e., the X-axis and the Y-axis) parallel to the substrate.

In the angular velocity sensor disclosed in Japanese Unexamined Patent Application Publication No. 2002-509615, a spring supports the ring-shaped vibrator in a state in which the spring is displaceable in all of the driving direction (i.e., the XY-planar direction) and the detecting direction (i.e., the Z-axis direction). Thus, because the spring and the ring-shaped vibrator are both used in driving and detecting vibrations, coupling is likely to occur between the driven vibration and the detected vibration.

Further, the ring-shaped vibrator is itself deformed in the XY-planar direction, and thus, the ring-shaped vibrator has a small width in the radial direction. The displacement of the ring-shaped vibrator in the Z-axis direction (i.e., the displacement caused by the Coriolis force) is detected by utilizing the electrostatic capacitance between a detection electrode provided on the substrate and the ring-shaped vibrator. However, because the width of the ring-shaped vibrator is relatively small, change in the capacitance between the ring-shaped vibrator and the detection electrode is also relatively small and the detection sensitivity tends to be reduced. In addition, the mass of the ring-shaped vibrator is relatively small such that the ring-shaped vibrator can be deformed in the XY-planar direction and the Z-axis direction. This causes another problem in that the resonance frequency of the ring-shaped vibrator is increased and the detection sensitivity of the angular velocity is reduced.

SUMMARY OF THE INVENTION

Preferred embodiments of the present invention overcome the above-described problems, and provide an angular velocity sensor that can detect angular velocities about two axes (e.g., an X-axis and a Y-axis) in a substrate surface with high accuracy and high sensitivity.

An angular velocity sensor according to a preferred embodiment of the present invention includes a base plate, four driven mass portions arranged to face the base plate with gaps provided therebetween and arranged at positions which are different in a circumferential direction about a central portion and which are point-symmetrical or substantially point-symmetrical with respect to the central portion, a coupling beam interconnecting the four driven mass portions and flexurally deforming when the four driven mass portions are displaced in a horizontal direction parallel or substantially parallel to the base plate, four connecting portions extending radially about the central portion, and each being arranged between two adjacent driven mass portions in the circumferential direction, and connected to the coupling beam, driven beams respectively disposed in the four connecting portions and supporting the connecting portions so as to be displaceable in a lengthwise direction thereof when the coupling beam is flexurally deformed, driving elements arranged to vibrate the four driven mass portions in the circumferential direction about the central portion in a state in which two adjacent ones of the driven mass portions in the circumferential direction are vibrated in opposite phases, detecting mass portions disposed respectively in the four driven mass portions, detecting beams disposed between the detecting mass portions and the driven mass portions and supporting the detecting mass portions so as to be displaceable in a direction of thickness of the base plate, and displacement detecting elements arranged to detect displacements of the detecting mass portions in the direction of thickness of the base plate.

According to this preferred embodiment of the present invention, since the four driven mass portions are arranged at the point-symmetrical positions with respect to the central portion, one pair of two driven mass portions are opposed to each other with the central portion interposed therebetween, and the other pair of the remaining two driven mass portions are also opposed to each other with the central portion interposed between them. Further, the two driven mass portions and the remaining two driven mass portions are arranged at positions that are different from one another. Therefore, for example, when the base plate extends along an X-Y plane parallel to an X-axis and a Y-axis, the two driven mass portions are arranged so as to lie on a line (e.g., the X-axis) extending past the central portion, and the remaining two driven mass portions are arranged so as to lie on another line (e.g., the Y-axis) extending past the central portion. Moreover, since the four driven mass portions are vibrated in the circumferential direction around the central portion, the two driven mass portions arranged along, e.g., the X-axis are vibrated in the Y-axis direction, and the two driven mass portions arranged along, e.g., the Y-axis are vibrated in the X-axis direction.

When an angular velocity about the X-axis is exerted, Coriolis forces acting in the Z-axis direction (i.e., the direction of thickness of the base plate) are generated in the driven mass portions, which are vibrated in the Y-axis direction, depending on the angular velocity. On the other hand, when an angular velocity about the Y-axis is exerted, Coriolis forces acting in the Z-axis direction (i.e., the direction of thickness of the base plate) are generated in the driven mass portions, which are vibrated in the X-axis direction, depending on the angular velocity.

Since the detecting mass portions displaceable in the Z-axis direction are disposed respectively in the four driven mass portions, the detecting mass portions vibrating in the Y-axis direction are displaced in the Z-axis direction depending on the angular velocity about the X-axis, and the detecting mass portions vibrating in the X-axis direction are displaced in the Z-axis direction depending on the angular velocity about the Y-axis. Accordingly, the angular velocities acting about two axes, which extend horizontally parallel or substantially parallel to the base plate, can be detected by detecting the displacements of the four driven mass portions in the direction of thickness of the base plate with the displacement detecting elements.

Further, the four driven mass portions are preferably arranged at point-symmetrical positions with respect to the central portion and are vibrated in the state in which adjacent two of the driven mass portions in the circumferential direction are vibrated in opposite phases. Therefore, the position of the center of gravity of the four driven mass portions can be fixed, and rotating torques generated in the four driven mass portions in the circumferential direction can be canceled out. In this situation, for example, even when manufacturing variations are generated in the four driven mass portions, the driven mass portions are vibrated in a state in which the amplitudes and the phases of their vibrations are substantially matched with one another, because the coupling beam interconnects the four driven mass portions. As a result, fluctuations in the position of the center of gravity and the rotating torque in the four driven mass portions can be reliably and effectively reduced, and the vibrations of the driven mass portions can be prevented from leaking to the base plate in the driven state.

Moreover, the driven mass portions are preferably supported by the driven beams and the detecting mass portions are preferably supported by the detecting beams. Therefore, the driven mass portions and the detecting mass portions can be supported by using separate beams (i.e., the driven beams and the detecting beams), which are independent from one another, and coupling between the vibrations having been driven and the vibrations to be detected can be reduced as compared to the case in which the driven mass portions and the detecting mass portions are supported by common beams. Accordingly, when the displacement detecting elements detect the respective displacements of the detecting mass portions and output displacement detection signals, components of the driven vibrations which provide noise signals are not mixed in the displacement detection signals. As a result, the noise signal included in each angular velocity signal can be relatively reduced, the angular velocity signal with a high SN ratio can be obtained, and the detection accuracy of the sensor can be greatly improved.

Since the driven mass portions and the detecting mass portions are not required to deform themselves, the masses of the driven mass portions and the detecting mass portions can preferably be increased so as to lower their resonance frequencies. It is therefore possible to increase the displacements of the detecting mass portions, which are caused by the Coriolis forces, and to improve the accuracy in detection of the angular velocities. Further, areas of the detecting mass portions can preferably be increased. As a result, even when the displacement detecting element is defined using detecting electrodes which are arranged in an opposed relationship to the detecting mass portions in the Z-axis direction, changes of electrostatic capacitances caused by the displacements of the detecting mass portions in the Z-axis direction can be increased, whereby the detection accuracy can be improved.

In addition, the four connecting portions extending radially are connected to the coupling beam, and the driven beams supporting the connecting portions to be displaceable in the lengthwise direction thereof are disposed in the connecting portions. Therefore, even if distortions are generated in the base plate, these distortions can be absorbed by the driven beams. For example, the influence of a tensile force upon the coupling beam can be reduced. As a result, the resonance frequencies of the driven mass portions and the detecting mass portions are less likely to change, and fluctuations in characteristics can be reduced.

The detecting beams may preferably be defined by torsional support beams, which extend in the circumferential direction about the central portion and which torsionally deform when the detecting mass portions are displaced in the direction of thickness of the base plate.

With this configuration, the torsional support beams can preferably be formed by processing, e.g., a silicon material in the vertical direction of the base plate, and the processing can be easily performed. While the spring constant of each torsional support beam varies in proportion to the third power of its width, the driven beams and the coupling beam also have substantially the same property. Thus, the influence of manufacturing variations in the beam widths on the difference in the resonance frequency between a driving mode and a detection mode can be significantly reduced, and the fluctuations in the sensitivity of the sensor are effectively reduced.

The detecting beams may preferably be connected to the detecting mass portions and the driven mass portions through stress reduction connecting portions, which reduce stresses acting on ends of the detecting mass portions when the detecting mass portions are torsionally deformed.

For example, when the detecting beam is defined by using a torsional support beam in the form of a single slender plate and the opposite ends of the detecting beam are fixed, torsional deformation of the detecting beam is prevented by stresses acting on the fixed portions of the detecting beam. Therefore, when the thickness of the detecting beam is changed, changes of the resonance frequency that correspond to the change in the thickness are increased. As a result, the manufacturing variations increase the influence on the difference in the resonance frequency between the driving mode and the detection mode.

In contrast, the detecting beams are preferably connected to the detecting mass portions and the driven mass portions through the stress reduction connecting portions that provide the detecting beams width a degree of freedom in the lengthwise direction thereof. It is therefore possible to reduce distortions and stresses acting on the opposite ends of each of the detecting beams because the end sides of each of the detecting beams are displaceable when the detecting beams are torsionally deformed. As a result, the influence of the manufacturing variations in the thickness of the detecting beams on the difference in the resonance frequency between the driving mode and the detection mode is effectively reduced, and the fluctuations in sensitivity of the sensor are significantly reduced.

The coupling beam may preferably be disposed on a side close to the central portion surrounded by the four driven mass portions.

With such an arrangement, the entire length of the coupling beam can be reduced and the rigidity of the coupling beam in the vertical direction of the base plate can be increased. Therefore, the driven mass portions can be prevented from displacing in the vertical direction of the base plate, and noises caused by the displacements of the driven mass portions can be reduced.

The driving elements may preferably include movable-side driving electrodes disposed in the driven mass portions and stationary-side driving electrodes disposed on the base plate in an opposed relationship to the movable-side driving electrodes, and the driven mass portions may be vibrated by electrostatic forces acting between the movable-side driving electrodes and the stationary-side driving electrodes.

With such a configuration, the driven mass portions can be directly displaced by the electrostatic forces acting between the movable-side driving electrodes and the stationary-side driving electrodes so that the driven mass portions can be vibrated in the driven state.

In a preferred embodiment of the present invention, the displacement detector may include stationary-side detecting electrodes disposed in an opposed relation to the detecting mass portions in the direction of the thickness, the stationary-side detecting electrodes of the displacement detector may be electrically connected to detecting lands disposed on the base plate, the stationary-side driving electrodes of the driving device may be electrically connected to driving lands disposed on the base plate, and shield lands may be disposed between the driving lands and the detecting lands to block off signal interference.

With such a construction, coupling between the driving lands and the detecting lands can be blocked off by the presence of the shield lands, and signal interference between them can be cut off. As a result, a driving signal supplied to the driving device is prevented from being mixed into the displacement detection signals output from the displacement detector. Hence, the accuracy in detection of the angular velocities can be enhanced.

The driving elements may preferably include movable-side driving electrodes disposed in connection to the coupling beam and stationary-side driving electrodes disposed on the base plate in an opposed relationship to the movable-side driving electrodes, and the driven mass portions may be vibrated by causing the coupling beam to flexurally deform with electrostatic forces acting between the movable-side driving electrodes and the stationary-side driving electrodes.

According to various preferred embodiments of the present invention, since the driving elements preferably include the movable-side driving electrodes disposed in connection to the coupling beam and the stationary-side driving electrodes disposed on the base plate, the coupling beam can be flexurally deformed by the electrostatic forces acting between the movable-side driving electrodes and the stationary-side driving electrodes. As a result, the driven mass portions connected to the coupling beam can be indirectly displaced so that the driven mass portions can be vibrated in the driven state.

Further, since the driving elements are not required to be disposed around the driven mass portions, the sizes of the driven mass portions and the detecting mass portions can be increased so as to improve the accuracy of detection of the angular velocities. On the other hand, with the arrangement in which the driving elements are not disposed around the driven mass portions, the entire size of the sensor can be reduced and the manufacturing cost can be reduced.

Even if electrical crosstalk occurs between the driving elements and the displacement detecting due to, for example, capacitive coupling therebetween, the electrical crosstalk can be generated in a symmetrical state at a minimum. As a result, noises mixed into the displacement detection signals can be reduced.

Further, since the stationary-side driving electrodes only need to be connected to an external circuit at only one location in the central portion of the base plate, the number of terminals to be connected to the external circuit can be reduced. Accordingly, the overall size of the sensor can be reduced and the manufacturing cost can be reduced.

In preferred embodiments of the present invention, monitoring elements arranged to monitor displacements of the driven mass portions in directions of vibrations thereof may be disposed around the driven mass portions, and the monitoring elements may preferably include movable-side monitoring electrodes disposed in the driven mass portions and stationary-side monitoring electrodes disposed on the base plate in an opposed relation to the movable-side monitoring electrodes, and may detect the displacements of the driven mass portions based on electrostatic capacitances between the movable-side monitoring electrodes and the stationary-side monitoring electrodes.

Since the monitoring elements arranged to monitor displacements of the driven mass portions in directions of vibrations thereof are disposed around the driven mass portions, the amplitudes and the phases of the vibrations in the driven mass portions can be detected using the monitoring elements. Therefore, an oscillation circuit arranged to drive the driven mass portions to vibrate can utilize, as a reference signal, output signals of the monitoring elements. Thus, the resonance state can be stabilized. Further, an angular velocity detection circuit can also utilize, as a reference signal, the output signals of the monitoring elements. Thus, synchronous detection can be precisely performed depending on the vibration states of the driven mass portions.

The above and other elements, features, steps, characteristics and advantages of the present invention will become more apparent from the following detailed description of the preferred embodiments with reference to the attached drawings.

BRIEF DESCRIPTION OF THE DRAWINGS

in FIG. 15.

DETAILED DESCRIPTION OF PREFERRED EMBODIMENTS

Figure 1:
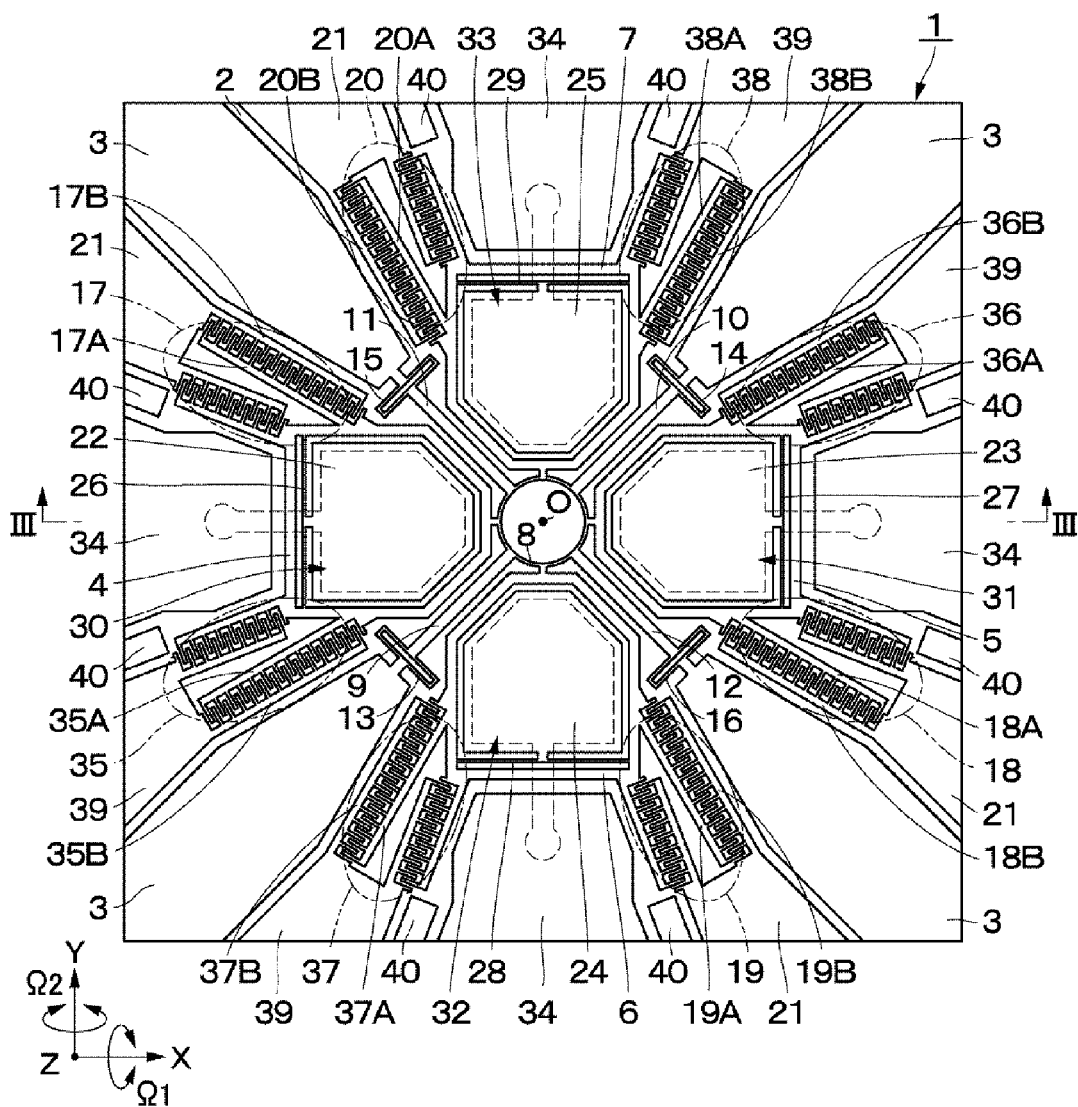
FIG. 1 is a plan view of an angular velocity sensor according to a first preferred embodiment of the present invention in a state in which a cover plate is removed.

Angular velocity sensors according to preferred embodiments of the present invention will be described in detail below with reference to the accompanying drawings.

FIGS. 1 to 6 illustrate an angular velocity sensor 1 according to a first preferred embodiment of the present invention. As illustrated in FIGS. 1 to 6, the angular velocity sensor 1 includes a base plate 2, driven mass portions 4 to 7, a coupling beam 8, connecting portions 9 to 12, driven beams 13 to 16, vibration generating portions 17 to 20, detecting mass portions 22 to 25, detecting beams 26 to 29, displacement detecting portions 30 to 33, and vibration monitoring portions 35 to 38.

A base plate 2 defines a base portion of the angular velocity sensor 1. The base plate 2 is preferably a rectangular or substantially rectangular flat plate made of, e.g., a glass material. The base plate 2 extends horizontally in, e.g., X- and Y-axis directions among three X-, Y- and Z-axis directions that are perpendicular to one another.

On and above the base plate 2, support portions 3, the driven mass portions 4 to 7, the coupling beam 8, the connecting portions 9 to 12, the driven beams 13 to 16, driving lands 21, the detecting mass portions 22 to 25, the detecting beams 26 to 29, detecting land 34, the vibration monitoring portions 35 to 38, monitoring lands 39, shield lands 40, are formed by etching, e.g., a silicon material that is electrically conductive and has low resistance.

The support portions 3 are disposed on the surface of the base plate 2. The support portions 3 are arranged at four corners of the base plate 2, respectively. In a central portion of the base plate 2 surrounded by the four support portions 3, the driven mass portions 4 to 7 and the detecting mass portions 22 to 25 are disposed in a floating state above the base plate 2. Further, movable-side driving electrodes 17A to 20A of the vibration generating portions 17 to 20, the detecting mass portions 22 to 25 defining movable-side detecting electrodes of the displacement detecting portions 30 to 33, which will be described below, are connected to a ground through the support portions 3.

The driven mass portions 4 to 7 are arranged at point-symmetrical locations with respect to a center (central point O) and gaps are provided between the driven mass portions 4 to 7 and the surface of the base plate 2. Also, the driven mass portions 4 to 7 are preferably arranged at an equal interval of about 90° therebetween in the circumferential direction about the central point O. Thus, the X-axis driven mass portions 4 and 5 are arranged so as to be disposed on the X-axis in an opposed relationship with the central point O interposed therebetween. The Y-axis driven mass portions 6 and 7 are preferably arranged so as to be disposed on the Y-axis, which is perpendicular to the X-axis, in an opposed relationship with the central point O interposed therebetween.

Further, each of the driven mass portions 4 to 7 is preferably configured in the shape of, e.g., a substantially pentagonal frame. Each of the X-axis driven mass portions 4 and 5 is preferably configured such that an inner portion in the X-axis direction projects toward the central point O and a width thereof (i.e., a size in the Y-axis direction) gradually decreases as the inner portion approaches the central point O. Similarly, each of the Y-axis driven mass portions 6 and 7 is configured such that an inner portion in the Y-axis direction projects toward the central point O and a width thereof (i.e., a size in the X-axis direction) gradually decreases as the inner portion approaches the central point O. Connecting arm portions 4A to 7A projecting toward the central point O are disposed respectively at inner-peripheral projecting portions (apex portions) of the driven mass portions 4 to 7. The connecting arm portions 4A to 7A have high rigidity so that each connecting arm portion will not flexurally deform in any directions of the X-, Y- and Z-axis. Tip ends of the connecting arm portions 4A to 7A define fulcrums, for example, when the driven mass portions 4 to 7 are vibrated in an X-Y plane.

The coupling beam 8 has a ring shape surrounding the central point O which interconnects the driven mass portions 4 to 7. More specifically, the coupling beam 8 preferably has the shape of, e.g., a substantially circular slender-ring frame. Opposite ends of the coupling beam 8 in the X-axis direction and opposite ends thereof in the Y-axis direction are connected to the tip ends of the connecting arm portions 4A to 7A. Further, when the driven mass portions 4 to 7 are driven to vibrate in the circumferential direction about the central point O in a state that is parallel or substantially parallel to the base plate 2, the coupling beam 8 is caused to flexurally deform into an elliptical shape (see FIG. 6). With the deformation, the coupling beam 8 makes an adjustment such that amplitudes and phases of respective vibrations in the driven mass portions 4 to 7 are matched with one another in the driven state.

Figure 2:
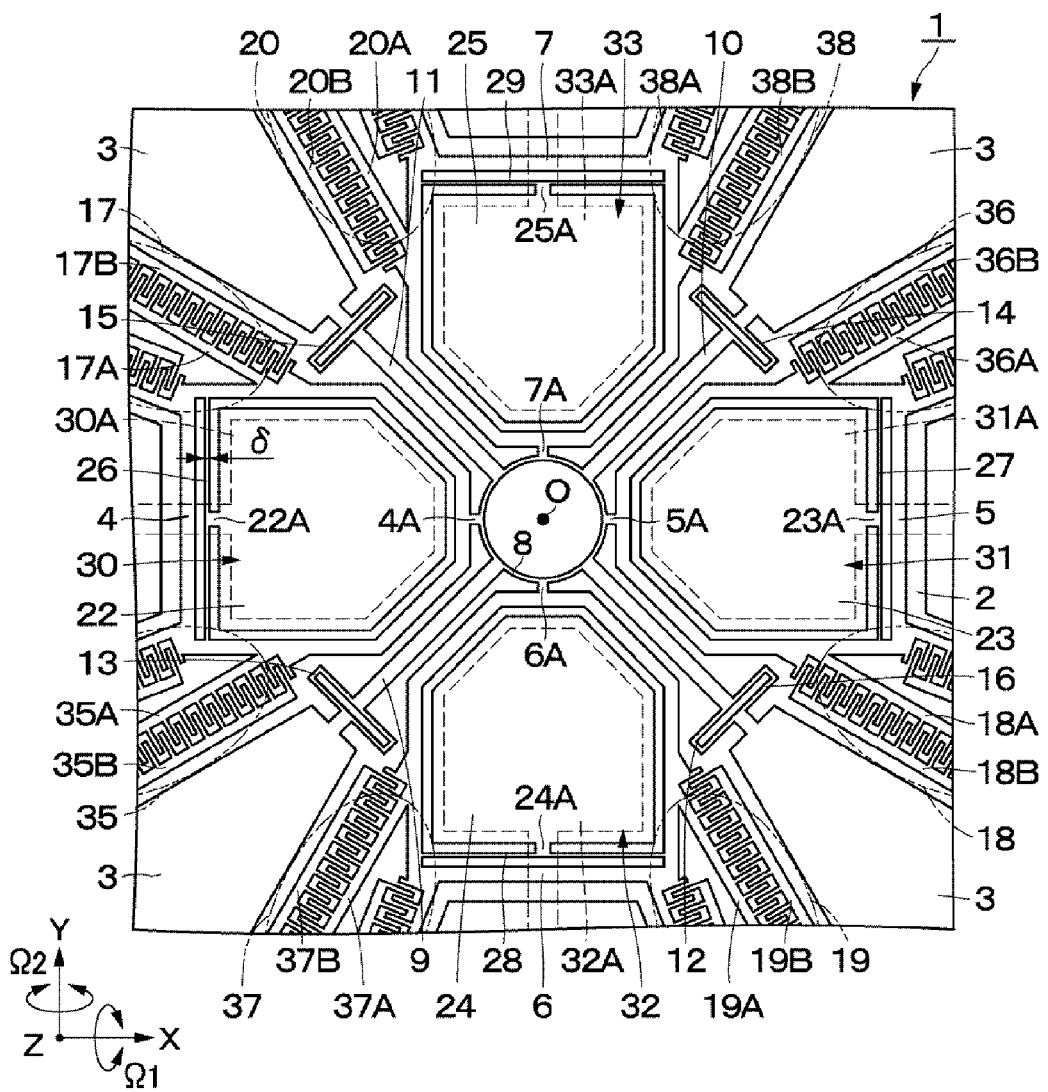
FIG. 2 is a plan view illustrating, in an enlarged scale, a principal portion of the angular velocity sensor in FIG. 1.
Figure 3:
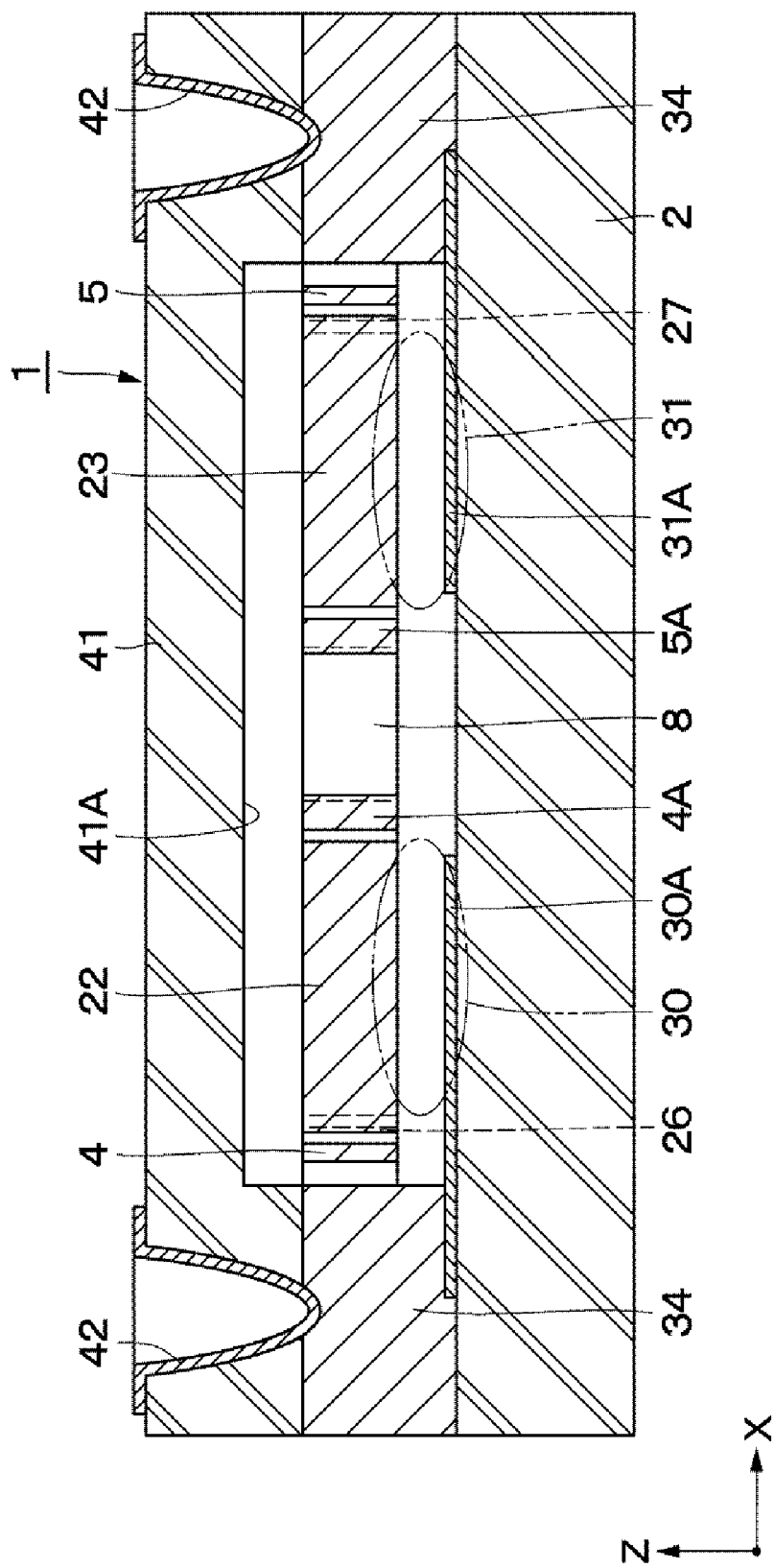
FIG. 3 is a sectional view of the angular velocity sensor taken along a line III-III in a direction denoted by arrows in FIG. 1.
Figure 4:
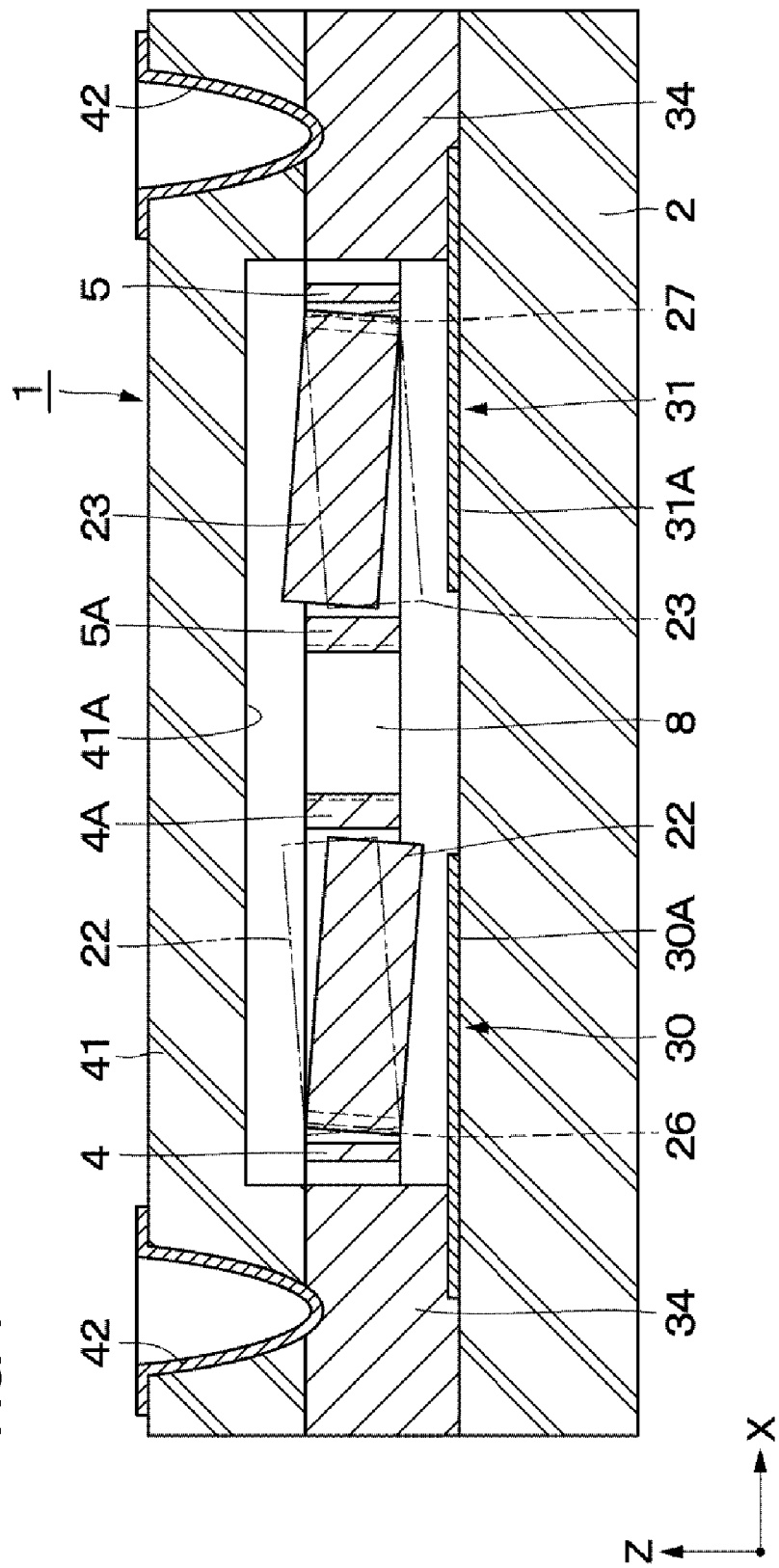
FIG. 4 is a sectional view of the angular velocity sensor, taken at a position similar to that in FIG. 3, illustrating a state where detecting mass portions are vibrated in the Z-axis direction.
Figure 5:
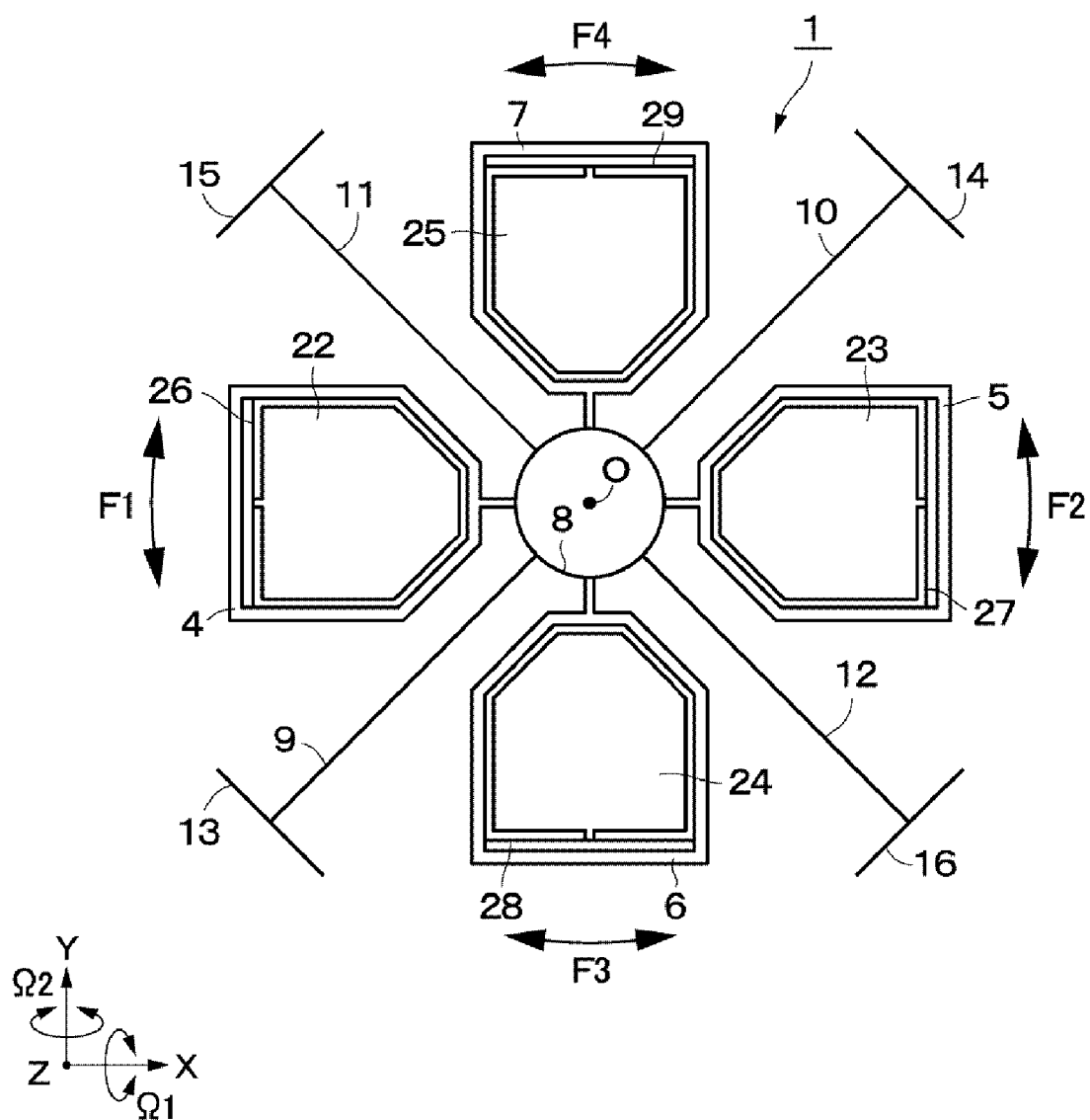
FIG. 5 is an explanatory view illustrating the angular velocity sensor.
Figure 6:
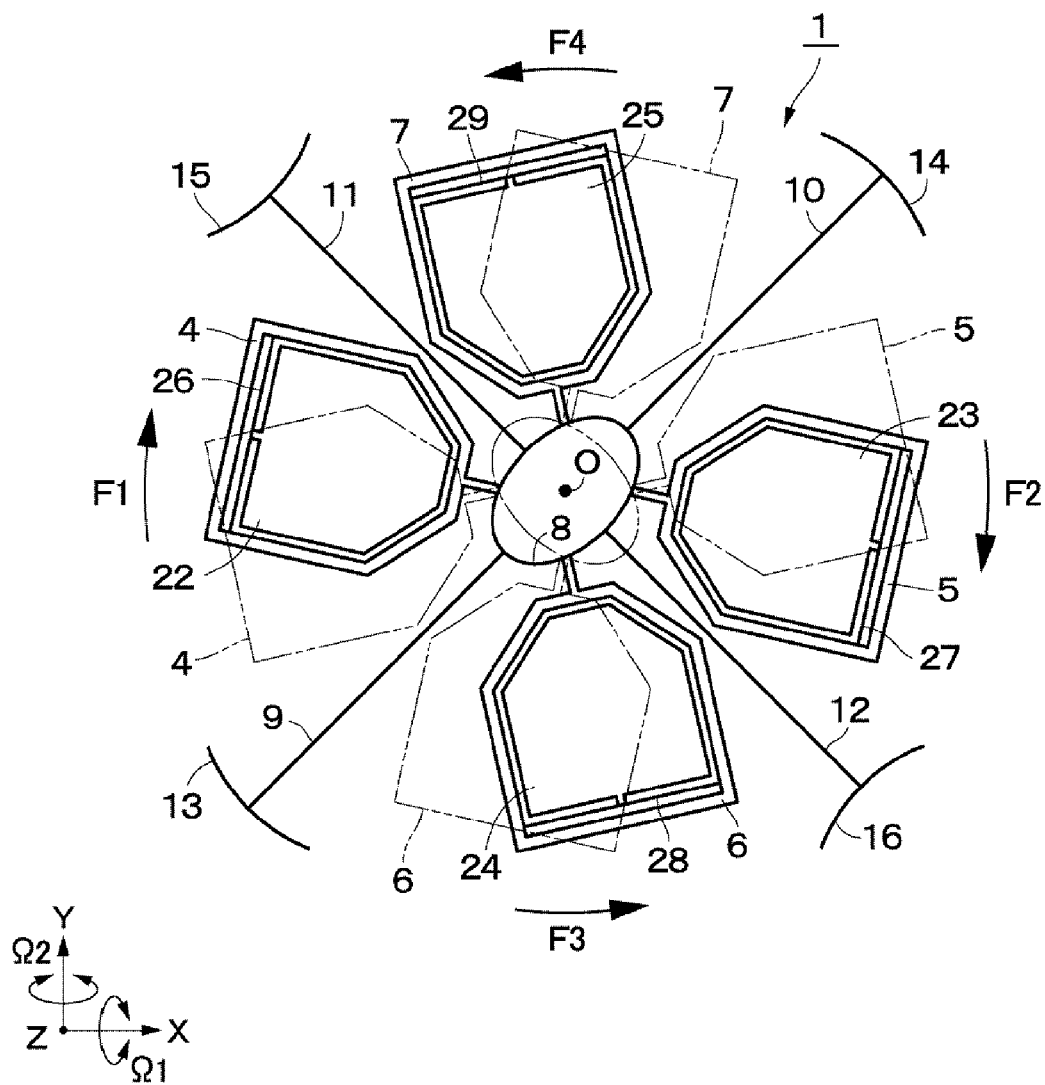
FIG. 6 is an explanatory view illustrating the angular velocity sensor in a state where driven mass portions are vibrated.

As illustrated in FIGS. 1 and 2, the connecting portions 9 to 12 extend radially about the central point O and are connected to the coupling beam 8. Further, each of the connecting portions 9 to 12 is arranged respectively between adjacent two of the driven mass portions 4 to 7 in the circumferential direction and are arranged at the point-symmetrical locations with respect to the central point O. More specifically, the connecting portion 9 is arranged between the driven mass portions 4 and 6 and the connecting portion 10 is arranged between the driven mass portions 5 and 7 such that the connecting portions 9 and 10 are preferably disposed on an axis, which is inclined about 45° relative to the X-axis, in an opposed relationship. Similarly, the connecting portion 11 is arranged between the driven mass portions 4 and 7 and the connecting portion 12 is arranged between the driven mass portions 5 and 6 such that the connecting portions 11 and 12 are preferably disposed on an axis, which is inclined about −45° relative to the X-axis, in an opposed relation. Thus, the connecting portions 9 and 10 and the connecting portions 11 to 12 are perpendicular or substantially perpendicular to each other. Further, the connecting portions 9 to 12 have high rigidity so that each connecting portion will not flexurally deform in any directions of the X-, Y- and Z-axis.

The driven beams 13 to 16 are disposed respectively at tip ends of the connecting portions 9 to 12 to interconnect the connecting portions 9 to 12 and the corresponding support portions 3. Each of the driven beams 13 to 16 are preferably defined, for example, by arranging two folded beams in an opposed relationship and are configured in the shapes of slender frames extending perpendicular or substantially perpendicular to the connecting portions 9 to 12. Further, when the connecting portions 9 to 12 are displaced in the lengthwise direction, the driven beams 13 to 16 are caused to flexurally deform such that spaces defined by the slender frames expand and contract. Thus, the driven beams 13 to 16 respectively support the connecting portions 9 to 12 to be displaceable in the lengthwise direction when the coupling beam 8 is caused to flexurally deform.

The vibration generating portions 17 to 20 define driving elements arranged to drive and vibrate the driven mass portions 4 to 7, respectively. The vibration generating portions 17 to 20 are preferably defined by the movable-side driving electrodes 17A to 20A attached to the outer-peripheral sides of the driven mass portions 4 to 7 and stationary-side driving electrodes 17B to 20B attached to the driving lands 21 on the base plate 2.

The movable-side driving electrode 17A is preferably defined by two comb-shaped electrodes radially extending from, e.g., the driven mass portion 4 outward in the radial direction about the central point O. Each of the comb-shaped electrodes includes a plurality of electrode plates arranged at intervals in the lengthwise direction thereof. Further, the movable-side driving electrode 17A is arranged on one side of the driven mass portion 4 as viewed in the Y-axis direction.

The movable-side driving electrode 18A is preferably defined by two comb-shaped electrodes radially extending from, e.g., the driven mass portion 5 outward in the radial direction about the central point O. However, the movable-side driving electrode 18A is arranged on the other side of the driven mass portion 5 as viewed in the Y-axis direction. Thus, the movable-side driving electrode 17A and the movable-side driving electrodes 18A are arranged at point-symmetrical locations with respect to the central point O.

The movable-side driving electrode 19A is preferably defined by two comb-shaped electrodes radially extending from, e.g., the driven mass portion 6 outward in the radial direction about the central point O. Each of the comb-shaped electrodes preferably includes a plurality of electrode plates arranged at intervals in the lengthwise direction thereof. Further, the movable-side driving electrode 19A is arranged on one side of the driven mass portion 6 as viewed in the X-axis direction.

The movable-side driving electrode 20A is preferably defined by two comb-shaped electrodes radially extending from, e.g., the driven mass portion 7 outward in the radial direction about the central point O. However, the movable-side driving electrode 20A is arranged on the other side of the driven mass portion 7 as viewed in the X-axis direction. Thus, the movable-side driving electrode 19A and the movable-side driving electrodes 20A are arranged at point-symmetrical locations with respect to the central point O.

The stationary-side driving electrodes 17B to 20B are preferably defined by comb-shaped electrodes radially extending outward parallel or substantially parallel to those of the movable-side driving electrodes 17A to 20A. Further, the electrode plates of the movable-side driving electrodes 17A to 20A and the electrode plates of the stationary-side driving electrodes 17B to 20B are preferably interdigitated with gaps provided therebetween.

The stationary-side driving electrodes 17B to 20B are respectively attached to four driving lands 21 fixed to the base plate 2, and are electrically connected thereto. The four driving lands 21 are disposed, for example, at locations sandwiching the support portions 3 connected to the driven beams 15 and 16, namely on both sides of those support portions 3 as viewed in the direction of width thereof (i.e., in the circumferential direction about the central point). Thus, the stationary-side driving electrodes 17B to 20B and the driving lands 21 are also arranged at point-symmetrical locations with respect to the central point O similar to the movable-side driving electrodes 17A to 20A.

When the same driving signal (e.g., the same voltage signal) is applied to the stationary-side driving electrodes 17B and 18B, driving forces F1 and F2 (electrostatic forces) acting in opposite directions are generated along the Y-axis between the movable-side driving electrodes 17A, 18A and the stationary-side driving electrodes 17B, 18B. As a result, the driven mass portions 4 and 5 are vibrated in the Y-axis direction in opposite phases to each other.

On the other side, when the same driving signal (e.g., the same voltage signal) is applied to the stationary-side driving electrodes 19B and 20B, driving forces F3 and F4 (electrostatic forces) acting in opposite directions are generated along the X-axis between the movable-side driving electrodes 19A, 20A and the stationary-side driving electrodes 19B, 20B. As a result, the driven mass portions 6 and 7 are vibrated in the X-direction in opposite phases to each other.

Further, the vibration generating portions 17 to 20 cause the four driven mass portions 4 to 7 to vibrate in the circumferential direction about the central portion O in a state where adjacent two of the driven mass portions 4 to 7 in the circumferential direction are vibrated in opposite phases. Accordingly, when the driven mass portions 4 and 6 move closer to each other, the remaining driven mass portions 5 and 7 also move closer to each other while the driven mass portions 4 and 6 move farther away from the driven mass portions 5 and 7. On the other hand, when the driven mass portions 4 and 7 move closer to each other, the remaining driven mass portions 5 and 6 also move closer to each other while the driven mass portions 4 and 7 move farther away from the driven mass portions 5 and 6.

The detecting mass portions 22 to 25 are arranged in the driven mass portions 4 to 7 so as to be located inside the driven mass portions 4 to 7, respectively. Each of the detecting mass portions 22 to 25 is preferably defined by a plate having a substantially pentagonal shape similar to that of each of the driven mass portions 4 to 7. Further, the detecting mass portions 22 to 25 include respectively connection-purpose projecting portions 22A to 25A projecting outward in the radial direction. In addition, the detecting mass portions 22 to 25 are connected to the driven mass portions 4 to 7 through the connection-purpose projecting portions 22A to 25A and the detecting beams 26 to 29 (described below), respectively, in a state facing or being opposed to the surface of the base plate 2 with gaps provided therebetween.

The detecting beams 26 to 29 are disposed between the detecting mass portions 22 to 25 and the driven mass portions 4 to 7, respectively, at locations outside the detecting mass portions 22 to 25 in the radial direction, and they support the detecting mass portions 22 to 25 so as to be displaceable in the direction of thickness of the base plate 2. Further, the detecting beams 26 to 29 are defined by torsional support beams, which extend in the circumferential direction about the central point O and which torsionally deform when the detecting mass portions 22 to 25 are displaced in the direction of thickness of the base plate 2. Each of the detecting beams 26 to 29 preferably includes a slender plate-shaped beam having a width δ and extending linearly.

The detecting beams 26 and 27 are arranged within the driven mass portions 4 and 5, respectively, while extending in the Y-axis direction. The connection-purpose projecting portions 22A and 23A of the detecting mass portions 22 and 23 are attached to respective central portions of the detecting beams 26 and 27 in the lengthwise direction thereof. Also, the detecting beams 28 and 29 are arranged within the driven mass portions 6 and 7, respectively, while extending in the X-axis direction. The connection-purpose projecting portions 24A and 25A of the detecting mass portions 24 and 25 are attached to respective central portions of the detecting beams 28 and 29 in the lengthwise direction thereof. With such an arrangement, inner radially ends of the detecting mass portions 22 to 25, which are located closer to the central point O, define free ends and the detecting beams 26 to 29 respectively support the detecting mass portions 22 to 25 in a cantilevered state.

When an angular velocity $\Omega 1$ about the X-axis is exerted, Coriolis forces Fx acting in the Z-axis direction (i.e., the direction of thickness of the base plate 2) are generated in the driven mass portions 4 and 5, which are vibrated in the Y-axis direction, depending on the angular velocity $\Omega 1$. Because the detecting beams 26 and 27 support the detecting mass portions 22 and 23 in a displaceable manner in the Z-axis direction, the detecting mass portions 22 and 23 are caused to vibrate in the Z-axis direction depending on the angular velocity $\Omega 1$.

When an angular velocity $\Omega 2$ about the Y-axis is exerted, Coriolis forces Fy acting in the Z-axis direction (i.e., the direction of thickness of the base plate) are generated in the driven mass portions 6 and 7, which are vibrated in the X-axis direction, depending on the angular velocity $\Omega 2$. Because the detecting beams 28 and 29 support the detecting mass portions 24 and 25 in a displaceable manner in the Z-axis direction, the detecting mass portions 24 and 25 are caused to vibrate in the Z-axis direction depending on the angular velocity $\Omega 2$.

The displacement detecting portions 30 to 33 define displacement detecting elements arranged to detect respective displacements of the detecting mass portions 22 to 25 in the direction of thickness of the base plate 2. The displacement detecting portions 30 to 33 are respectively defined by the detecting mass portions 22 to 25 which define movable-side detecting electrodes, and stationary-side detecting electrodes 30A to 33A which are each preferably defined by, e.g., a conductor thin film disposed on the base plate 2. The detecting mass portions 22 to 25 and the stationary-side detecting electrodes 30A to 33A are opposed to each other in the Z-axis direction.

The stationary-side detecting electrodes 30A to 33A are respectively attached to four detecting lands 34 fixed to the base plate 2, and are electrically connected thereto. The four detecting lands 34 are arranged outside the driven mass portions 4 to 7 in the radial direction. Thus, the stationary-side detecting electrodes 30A to 33A and the detecting lands 34 are also arranged at point-symmetrical locations with respect to the central point O similar to the detecting mass portions 22 to 25.

When the detecting mass portions 22 to 25 are vibrated in the Z-axis direction, the distances between the detecting mass portions 22 to 25 and the stationary-side detecting electrodes 30A to 33A are changed. Therefore, electrostatic capacitances Cs1 to Cs4 between the detecting mass portions 22 to 25 and the stationary-side detecting electrodes 30A to 33A are also changed. Thus, the displacement detecting portions 30 to 33 detect respective displacements of the detecting mass portions 22 to 25 in the Z-axis direction based on the changes of the electrostatic capacitances Cs1 to Cs4 between the detecting mass portions 22 to 25 and the stationary-side detecting electrodes 30A to 33A.

The vibration monitoring portions 35 to 38 define monitoring elements arranged to detect respective displacements of the driven mass portions 4 to 7 in the directions of vibrations thereof. The vibration monitoring portions 35 to 38 are respectively defined by the movable-side monitoring electrodes 35A to 38A attached to the outer-peripheral sides of the driven mass portions 4 to 7 and stationary-side monitoring electrodes 35B to 38B attached to the monitoring lands 39 on the base plate 2.

Similar to the movable-side driving electrodes 17A to 20A of the vibration generating portions 17 to 20, each of the movable-side monitoring electrodes 35A to 38A are defined by two comb-shaped electrodes radially extending from the driven mass portions 4 to 7 outward in the radial direction about the central point O. However, the movable-side monitoring electrodes 35A and 36A are arranged on the side opposite to the movable-side driving electrodes 17A and 18A as viewed in the Y-axis direction with the driven mass portions 4 and 5 interposed therebetween. Similarly, the movable-side monitoring electrodes 37A and 38A are arranged on the side opposite to the movable-side driving electrodes 19A and 20A as viewed in the X-axis direction with the driven mass portions 6 and 7 interposed therebetween.

The stationary-side monitoring electrodes 35B to 38B are preferably defined by comb-shaped electrodes radially extending outward parallel or substantially parallel to those of the movable-side monitoring electrodes 35A to 38A. Further, electrode plates of the movable-side monitoring electrodes 35A to 38A and electrode plates of the stationary-side monitoring electrodes 35B to 38B are preferably interdigitated with gaps provided therebetween.

The stationary-side monitoring electrodes 35B to 38B are respectively attached to four monitoring lands 39 fixed to the base plate 2, and are electrically connected thereto. The four monitoring lands 39 are preferably arranged, for example, at locations sandwiching the support portions 3 connected to the driven beams 13 and 14, namely on both sides of those support portions 3 as viewed in the direction of width thereof (i.e., in the circumferential direction about the central point). Thus, the movable-side monitoring electrodes 35A to 38A, the stationary-side monitoring electrodes 35B to 38B, and the monitoring lands 39 are arranged at point-symmetrical locations with respect to the central point O.

When the driven mass portions 4 and 5 are displaced in the Y-axis direction, electrostatic capacitances Cm1 and Cm2 between the movable-side monitoring electrodes 35A, 36A and the stationary-side monitoring electrodes 35B, 36B are changed. Also, when the driven mass portions 6 and 7 are displaced in the X-axis direction, electrostatic capacitances Cm3 and Cm4 between the movable-side monitoring electrodes 37A, 38A and the stationary-side monitoring electrodes 37B, 38B are changed. Thus, the vibration monitoring portions 35 to 38 monitor respective vibration states of the driven mass portions 4 to 7 based on the changes of the electrostatic capacitances Cm1 to Cm4.

When the four driven mass portions 4 to 7 are driven in the state in which two adjacent ones of the driven mass portions 4 to 7 in the circumferential direction are vibrated in opposite phases, the electrostatic capacitances Cm1 to Cm4 in the vibration monitoring portions 35 to 38 are changed in a synchronized relationship.

The shield lands 40 are preferably arranged on both sides of the four detecting lands 34 in the circumferential direction and a total of eight shield lands 40 are disposed on the base plate 2. The shield lands 40 on both sides of each detecting land 34 are arranged between the driving land 21 and the detecting land 34 and between the monitoring land 39 and the detecting land 34. Further, the eight shield lands 40 are arranged at point-symmetrical locations with respect to the central point O.

Preferably, the shield lands 40 are arranged in an electrically insulated stated from the lands 21, 34 and 39 and are connected to a ground, for example. With this arrangement, the shield lands 40 electrically shield (isolate) the surroundings of the detecting lands 34 so as to prevent driving signals in the driving lands 21 and monitoring signals in the monitoring lands 39 from interfering with displacement detection signals in the detecting lands 34.

The cover plate 41 is preferably defined by a rectangular or substantially rectangular plate made of, e.g., a glass material. The cover plate 41 is bonded to the support portions 3, the driving lands 21, the detecting lands 34, the monitoring lands 39, and the shield lands 40 by anodic bonding or other suitable bonding method. Further, the cover plate 41 includes a cavity 41A preferably defined by a rectangular or substantially rectangular recess in a surface (rear surface) that is arranged to face the detecting mass portions 22 to 25, etc. The cavity 41A is arranged to face the driven mass portions 4 to 7, the coupling beam 8, the connecting portions 9 to 12, the driving beams 13 to 16, the detecting mass portions 22 to 25, the detecting beams 26 to 29, the vibration generating portions 17 to 20, and the vibration monitoring portions 35 to 38. Thus, the driven mass portions 4 to 7 and the detecting mass portions 22 to 25 can vibrate and be displaced without contacting the cover plate 41.

A plurality of via holes 42 are provided in the cover plate 41 so as to penetrate through the cover plate 41 in the direction of thickness thereof. The via holes 42 are provided at locations corresponding to the support portions 3 and the lands 21, 34, 39 and 40. Such an arrangement allows the support portions 3 to be connected to external electrodes (not shown), which are disposed on the cover plate 41, through the via holes 42. Accordingly, the vibration generating portions 17 to 20, the displacement detecting portions 30 to 33, and the vibration monitoring portions 35 to 38 can be connected to a vibration control circuit 51 and an angular velocity detection circuit 61 (described later) through the external electrodes.

Figure 7:
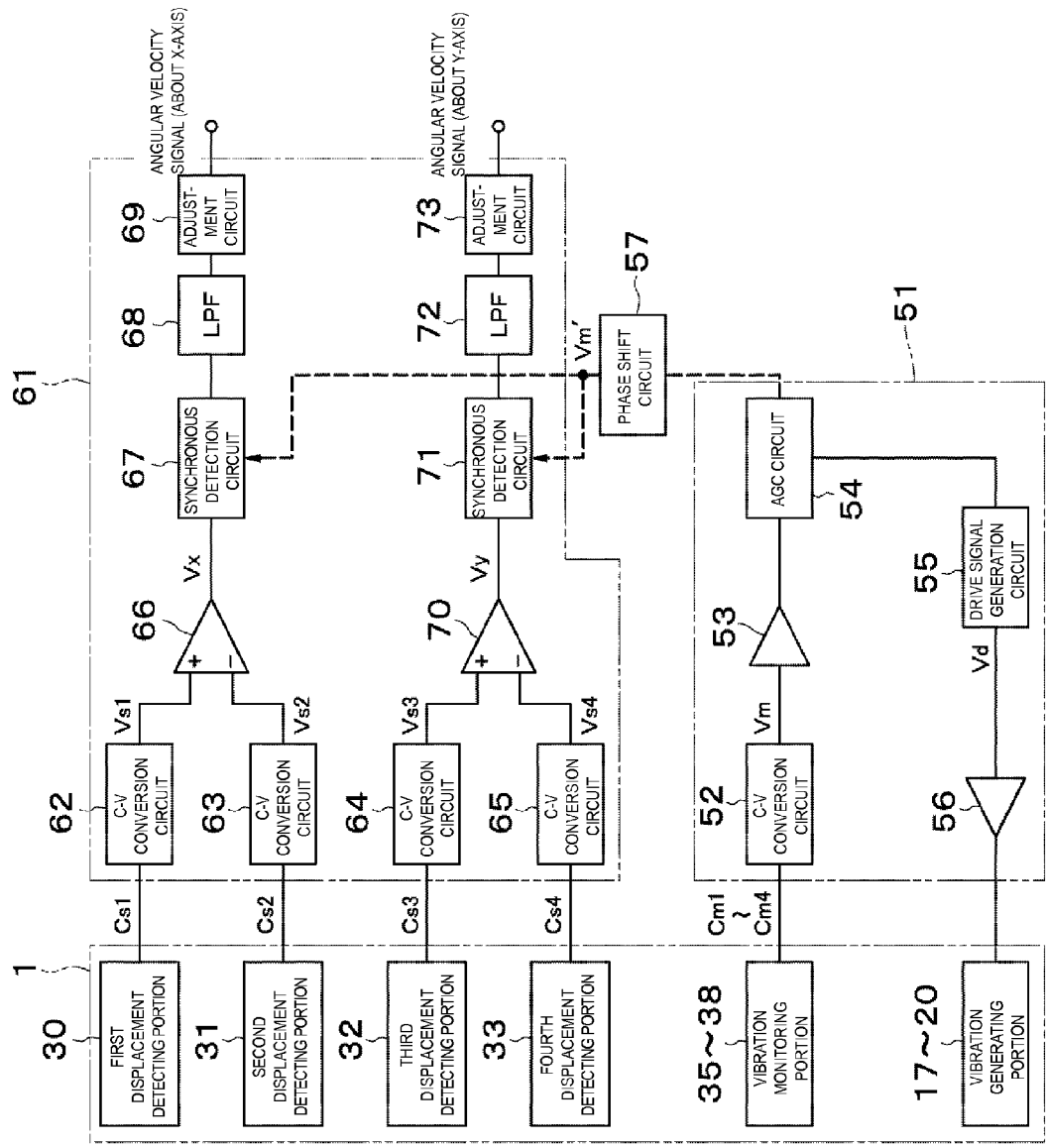
FIG. 7 is a circuit diagram illustrating a vibration control circuit, an angular velocity detection circuit, and an acceleration detection circuit in the angular velocity sensor.

The vibration control circuit 51 arranged to control the vibration states of the driven mass portions 4 to 7 will be described below with reference to FIG. 7. The vibration control circuit 51 controls a driving signal Vd, which is output to the vibration generating portions 17 to 20, by using a monitoring signal Vm obtained with the vibration monitoring portions 35 to 38. Further, the vibration control circuit 51 is preferably defined by a C-V conversion circuit 52, an amplifier 53, an AGC circuit 54, and a driving signal generation circuit 55, for example.

The C-V conversion circuit 52 is connected to the output sides of the vibration monitoring portions 35 to 38. The C-V conversion circuit 52 converts the changes of the electrostatic capacitances Cm1 to Cm4 in the vibration monitoring portions 35 to 38 to voltage changes and outputs those voltage changes as the monitoring signal Vm. The monitoring signal Vm is amplified by the amplifier 53 connected to the output side of the C-V conversion circuit 52, and is output to the AGC circuit 54.

The output side of the AGC circuit 54 is connected to the driving signal generation circuit 55 that outputs the driving signal Vd. The AGC circuit 54 adjusts its gain such that the monitoring signal Vm is maintained constant. The driving signal generation circuit 55 is connected to the vibration generating portions 17 to 20 through an amplifier 56. Thus, the driving signal generation circuit 55 causes the driving signal Vm to be input to the vibration generating portions 17 to 20, and the vibration generating portions 17 to 20 vibrate the driven mass portions 4 to 7 in the state in which two adjacent ones of the driven mass portions 4 to 7 in the circumferential direction are vibrated in opposite phases.

The angular velocity detection circuit 61 (angular velocity detection elements) arranged to detect the angular velocities $\Omega 1$ and $\Omega 2$ about two axes (i.e., the X-axis and the Y-axis) will be described below. The angular velocity detection circuit 61 performs synchronous detection of displacement detection signals Vx and Vy obtained with the displacement detecting portions 30 to 33 by using the monitoring signal Vm obtained with the vibration monitoring portions 35 to 38, and then detects the angular velocities $\Omega 1$ and $\Omega 2$ acting on the driven mass portions 4 to 7. The angular velocity detection circuit 61 is preferably defined, for example, by C-V conversion circuits 62 to 65, differential amplifiers 66 and 70, and synchronous detection circuits 67 and 71.

The C-V conversion circuits 62 to 65 convert the changes of electrostatic capacitances Cs1, Cs2, Cs3 and Cs4 in the displacement detecting portions 30 to 33 to voltage changes and output those voltage changes as preliminary displacement detection signals Vs1, Vs2, Vs3 and Vs4.

When the angular velocity $\Omega 1$ about the X-axis is exerted in the state in which two adjacent ones of the driven mass portions 4 to 7 are vibrated in opposite phases, the detecting mass portions 22 and 23 are caused to displace in the Z-axis direction in opposite phases to each other. In that case, the preliminary displacement detection signal Vs1 and the preliminary displacement detection signal Vs2 are output in opposite phases to each other.

The differential amplifier 66 is connected to the output sides of the C-V conversion circuits 62 and 63 and calculates the final displacement detection signal Vx from the difference between the preliminary displacement detection signals Vs1 and Vs2.

The input side of the synchronous detection circuit 67 is connected to the differential amplifier 66 and is further connected to the AGC circuit 54 through a phase shift circuit 57. A low-pass filter (LPF) 68 arranged to extract the angular velocity signal is connected to the output side of the synchronous detection circuit 67, and an adjustment circuit 69 arranged to adjust a gain and an offset is connected to the output side of the LPF 68. The phase shift circuit 57 outputs a phase shift signal Vm' by shifting the phase of the monitoring signal Vm through about 90°, which is output from the AGC circuit 54. Thus, the synchronous detection circuit 67 performs the synchronous detection of the displacement detection signal Vx by using the phase shift signal Vm' and outputs the angular velocity signal depending on the angular velocity $\Omega 1$ about the X-axis through the LPF 68 and the adjustment circuit 69.

On the other hand, when the angular velocity $\Omega 2$ about the Y-axis is exerted in the state in which two adjacent ones of the driven mass portions 4 to 7 are vibrated in opposite phases, the detecting mass portions 24 and 25 are displaced in the Z-axis direction in opposite phases to each other. In that case, the preliminary displacement detection signal Vs3 and the preliminary displacement detection signal Vs4 are output in opposite phases to each other.

The differential amplifier 70 is connected to the output sides of the C-V conversion circuits 64 and 65 and calculates the final displacement detection signal Vy from the difference between the preliminary displacement detection signals Vs3 and Vs4. Thus, as in the synchronous detection circuit 67, the synchronous detection circuit 71 performs the synchronous detection of the displacement detection signal Vy by using the phase shift signal Vm' and outputs the angular velocity signal depending on the angular velocity $\Omega 2$ about the Y-axis through an LPF 72 and an adjustment circuit 73.

A method of manufacturing the angular velocity sensor 1 according to a preferred embodiment of the present invention will be described below with reference to FIGS. 8 to 11.

Figure 8:
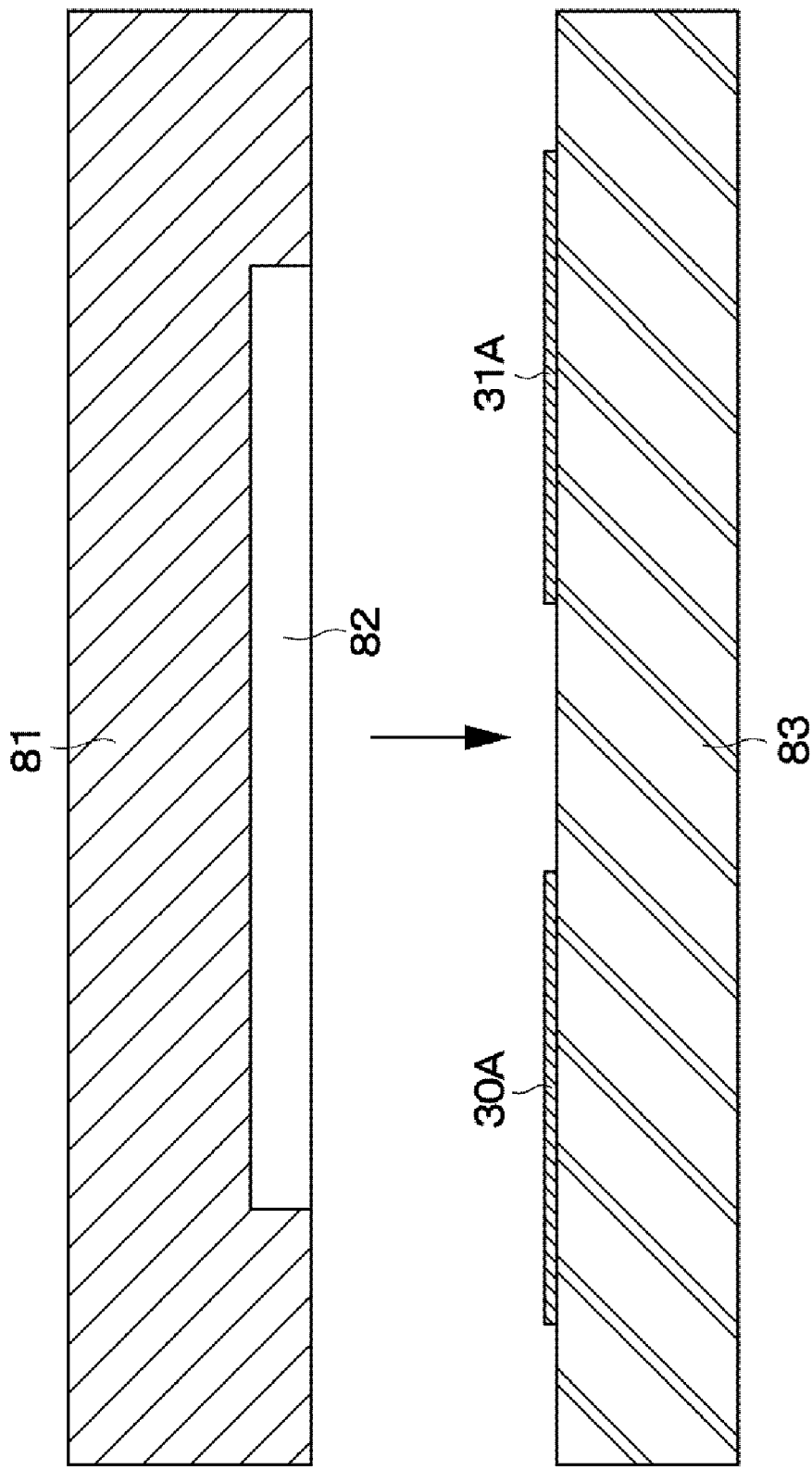
FIG. 8 is a sectional view, taken at a position similar to that in FIG. 3, illustrating a substrate bonding step.

In a substrate bonding step illustrated in FIG. 8, an etching process is previously performed on the rear surface of a silicon substrate 81 such that a central portion of the rear surface is etched away to form a substantially rectangular or substantially circular recess 82. On the other hand, the four stationary-side detecting electrodes 30A to 33A made of conductor thin films are formed by sputtering or other suitable method on the front surface of a glass substrate 83, which defines the base plate 2, at locations near the center of the substrate surface. Thereafter, the rear surface of the silicon substrate 81 is bonded to the front surface of the glass substrate 83 using a suitable bonding method, e.g., anodic bonding. At that time, the stationary-side detecting electrodes 30A to 33A are disposed inside the recess 82.

Figure 9:
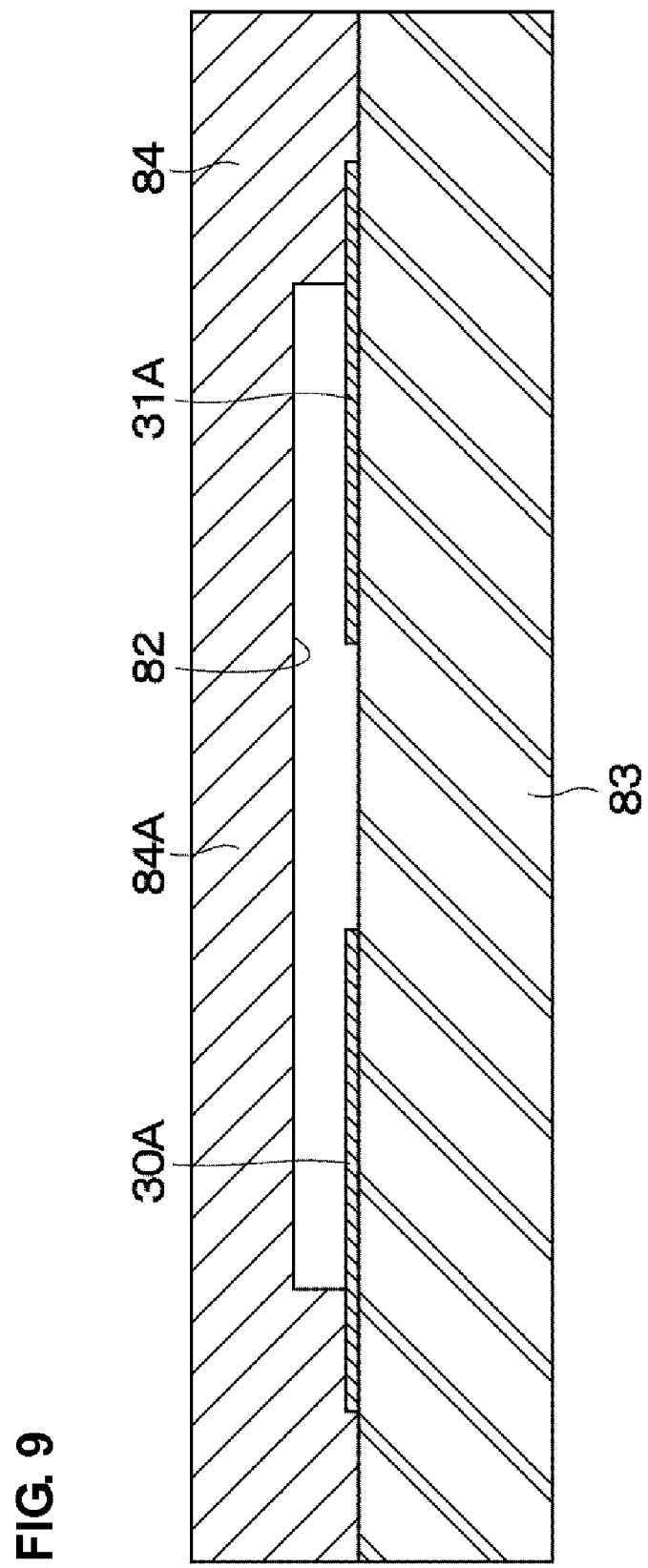
FIG. 9 is a sectional view, taken at a position similar to that in FIG. 3, illustrating a layer thinning step.

Next, in a layer thinning step illustrated in FIG. 9, the front surface of the silicon substrate 81 is polished to form a silicon layer 84 having a thin thickness. As a result, an outer edge portion of the silicon layer 84 is bonded to the glass substrate 83. Further, a thinner-wall portion 84A of the silicon layer 84, which corresponds to the recess 82, is located away from the glass substrate 83 with a gap provided therebetween.

Figure 10:
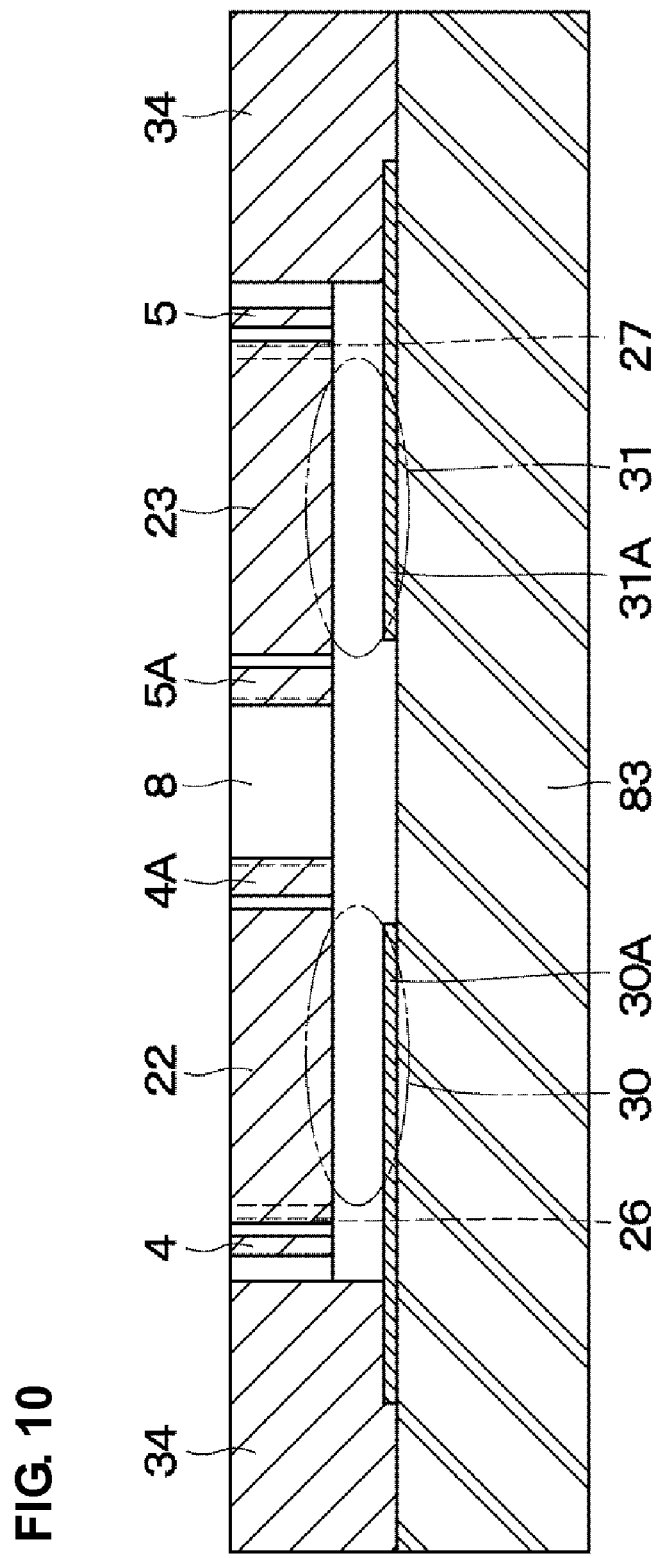
FIG. 10 is a sectional view, taken at a position similar to that in FIG. 3, illustrating a functional-portion forming step.

Next, in a functional-portion forming step illustrated in FIG. 10, the driven mass portions 4 to 7, the coupling beam 8, the connecting portions 9 to 12, the driving beams 13 to 16, the vibration generating portions 17 to 20, the detecting mass portions 22 to 25, the detecting beams 26 to 29, and the vibration monitoring portions 35 to 38 are formed in the thinner-wall portion 84A of the silicon layer 84 at respective corresponding positions through an etching process. Further, the support portions 3, the driving lands 21, the detecting lands 34, the monitoring lands 39, and the shield lands 40 are formed in the outer edge portion of the silicon layer 84. As a result, the detecting mass portions 22 to 25 are formed at positions opposite to the stationary-side detecting electrodes 30A to 33A in order to constitute the displacement detecting portions 30 to 33.

In addition, the stationary-side driving electrodes 17B to 20B of the vibration generating portions 17 to 20 are connected to the driving lands 21, the stationary-side detecting electrodes 30A to 33A of the displacement detecting portions 30 to 33 are connected to the detecting lands 34, and the stationary-side monitoring electrodes 35B to 38B of the vibration monitoring portions 35 to 38 are connected to the monitoring lands 39.

Figure 11:
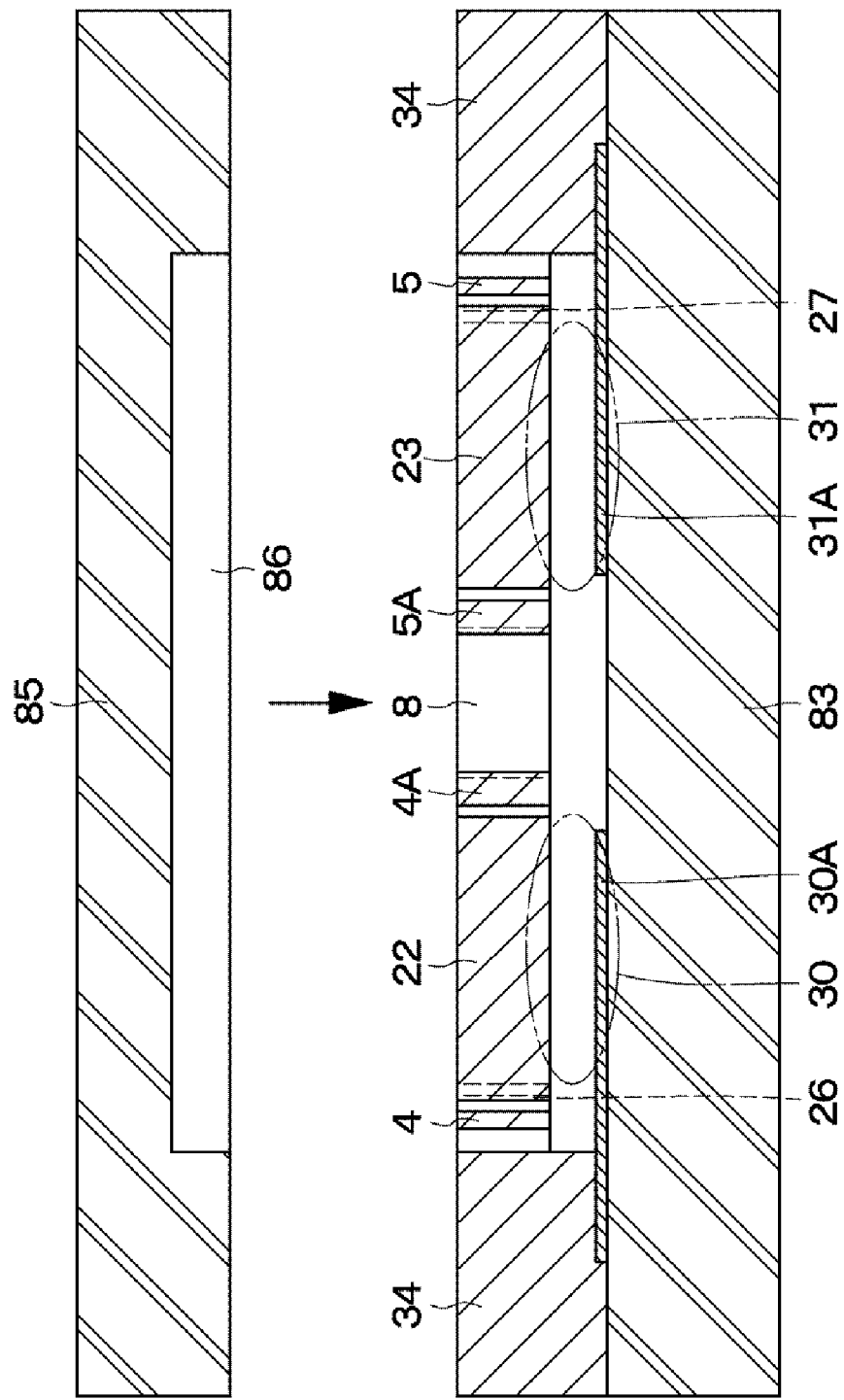
FIG. 11 is a sectional view, taken at a position similar to that in FIG. 3, illustrating a cover plate bonding step.

Next, in a cover plate bonding step illustrated in FIG. 11, a recess 86 defining the cavity 41A is previously formed on the backside of a glass plate 85 that defines the cover plate 41. When the recess 86 is formed, it is positioned so as to face the driven mass portions 4 to 7, the coupling beam 8, the connecting portions 9 to 12, the driving beams 13 to 16, the vibration generating portions 17 to 20, the detecting mass portions 22 to 25, the detecting beams 26 to 29, and the vibration monitoring portions 35 to 38.

The rear surface of the glass substrate 85 is bonded to the front surface of the silicon layer 84 by using a suitable bonding method, e.g., anodic bonding. As a result, the outer edge portions of the glass substrate 85 are bonded to the support portions 3 and the various lands 21, 34, 39 and 40. It is noted that the stationary-side detecting electrodes 30A to 33A may be formed in the glass substrate 85 (i.e., the cover plate 41) instead of the glass substrate 83.

Next, in an electrode forming step, the via holes 42 are formed in the cover plate 41 by performing a hole-forming process, e.g., sand blasting. At that time, the via holes 42 are formed at locations corresponding to the support portions 3 and the various lands 21, 34, 39 and 40. Finally, the external electrodes (not shown) for connection to external circuits are disposed on a front surface of the cover plate 41. The external electrodes are electrically connected to the support portions 3 and the various lands 21, 34, 39 and 40 through conductor films that are disposed on inner surfaces of the via holes 42. The angular velocity sensor 1 illustrated in FIGS. 1 to 6 is thereby completed. In addition, the vibration generating portions 17 to 20, the displacement detecting portions 30 to 33, and the vibration monitoring portions 35 to 38 are connected to the vibration control circuit 51, the angular velocity detection circuit 61, etc. through the external electrodes.

The via holes 42 may be formed in the glass substrate 83. Preferably, the via holes 42 are formed in one of the glass substrates 83 and 85 in which the stationary-side detecting electrodes 30A to 33A are formed. When the via holes are formed on one surface of the glass substrate, the interior of the glass substrate cannot be viewed through the one surface because thin-film wiring lines are formed on that surface. Also, it is inherently difficult to view the interior of the glass substrate through the surface on which the stationary-side detecting electrodes are formed, due to the presence of the stationary-side detecting electrodes. For that reason, the arrangement enabling the interior of the glass substrate to be viewed from the side opposite to the surface including the stationary-side detecting electrodes is preferable from the viewpoint of manufacturing.

The operation of the angular velocity sensor 1 according to the first preferred embodiment will be described below.

The case of detecting the angular velocity $\Omega 1$ about the X-axis is first described. When the driving signal Vd is input to the driving lands 21 from the external vibration control circuit 51, the driving signal Vd is applied to the stationary-side driving electrodes 17B to 20B of the vibration generating portions 17 to 20. Accordingly, electrostatic attractive forces act on the driven mass portions 4 and 5 in the Y-axis direction, thus causing the driven mass portions 4 and 5 to vibrate in the Y-axis direction. On the other hand, electrostatic attractive forces act on the driven mass portions 6 and 7 in the X-axis direction, thus causing the driven mass portions 6 and 7 to vibrate in the X-axis direction. Further, two adjacent ones of the driven mass portions 4 to 7 in the circumferential direction are vibrated in opposite phases to each other.

When the angular velocity $\Omega 1$ about the X-axis is exerted in the state in which the driven mass portions 4 to 7 are vibrated, the Coriolis force Fx expressed by the following Formula 1 acts on each of the driven mass portions 4 and 5, which are vibrated in the Y-axis direction, depending on the angular velocity $\Omega 1$. On the other hand, no Coriolis force acts on the driven mass portions 6 and 7, which are vibrated in the X-axis direction. By the action of the Coriolis force Fx, the detecting mass portions 22 and 23 are each caused to be displaced in the Z-axis direction and to vibrate depending on the angular velocity $\Omega 1$ about the X-axis.

$$Fx = 2 \times M \times \Omega 1 \times v \qquad \text{Formula 1}$$

where M: mass of the driven mass portions 4 and 5 and the detecting mass portions 22 and 23
$\Omega 1$: angular velocity about the X-axis
v: velocity of the driven mass portions 4 and 5 in the Y-axis Therefore, in the displacement detecting portions 30 and 31, the electrostatic capacitances Cs1 and Cs2 between the detecting mass portions 22, 23 and the stationary-side detecting electrodes 30A, 31A are changed depending on the displacements of the detecting mass portions 22 and 23 in the Z-axis direction. At that time, the C-V conversion circuits 62 and 63 in the angular velocity detection circuit 61 convert the changes of the electrostatic capacitances Cs1 and Cs2 to the preliminary displacement detection signals Vs1 and Vs2. Further, the differential amplifier 66 outputs, based on the difference between the displacement detection signals Vs1 and Vs2, the final displacement detection signal Vx depending on the angular velocity $\Omega 1$ about the X-axis. The synchronous detection circuit detects a signal, which is in sync with the phase shift signal Vm', from the displacement detection signal Vx. As a result, the angular velocity detection circuit 61 outputs the angular velocity signal depending on the angular velocity $\Omega 1$ about the X-axis.

The case of detecting the angular velocity $\Omega 2$ about the Y-axis is now described. The driving signal Vd is input to the driving lands 21 from the external vibration control circuit 51 to vibrate the driven mass portions 4 to 7. When the angular velocity $\Omega 2$ about the Y-axis is exerted in the vibrated state of the driven mass portions 4 to 7, the Coriolis force Fy expressed by the following Formula 2 acts on each of the driven mass portions 6 and 7, which are vibrated in the X-axis direction, depending on the angular velocity $\Omega 2$. On the other hand, no Coriolis force acts on the driven mass portions 4 and 5, which are vibrated in the Y-axis direction. By the action of the Coriolis force Fy, the detecting mass portions 24 and 25 are each caused to displace in the Z-axis direction and to vibrate depending on the angular velocity $\Omega 2$.

$$Fy = 2 \times M \times \Omega 2 \times v \qquad \text{Formula 2}$$

where M: mass of the driven mass portions 6 and 7 and the detecting mass portions 24 and 25
$\Omega 2$: angular velocity about the Y-axis
v: velocity of the driven mass portions 6 and 7 in the X-axis Therefore, in the displacement detecting portions 32 and 33, the electrostatic capacitances Cs3 and Cs4 between the detecting mass portions 24, 25 and the stationary-side detecting electrodes 32A, 33A are changed depending on the displacements of the detecting mass portions 24 and 25 in the Z-axis direction. At that time, the C-V conversion circuits 64 and 65 in the angular velocity detection circuit 61 convert the changes of the electrostatic capacitances Cs3 and Cs4 to the displacement detection signals Vs3 and Vs4. Further, the differential amplifier 70 outputs, based on the difference between the displacement detection signals Vs3 and Vs4, the displacement detection signal Vy depending on the angular velocity $\Omega 2$ about the Y-axis. The synchronous detection circuit 71 detects a signal, which is in sync with the phase shift signal Vm', from the displacement detection signal Vy. As a result, the angular velocity detection circuit 61 outputs the angular velocity signal depending on the angular velocity $\Omega 2$ about the Y-axis.

In this preferred embodiment, as described above, since the four driven mass portions 4 to 7 are arranged at the point-symmetrical locations with respect to the central point O, the two driven mass portions 4 and 5 can be arranged on both sides of the central point O in the X-axis direction, and the two driven mass portions 6 and 7 can be arranged on both sides of the central point O in the Y-axis direction. Further, two adjacent ones of the driven mass portions 4 to 7 in the circumferential direction are vibrated in opposite phases to each other.

Therefore, when the angular velocity $\Omega 1$ about the X-axis is exerted, the Coriolis force Fx acting in the Z-axis direction can be generated in each of the driven mass portions 4 and 5 vibrating in the Y-axis direction. Thus, when the angular velocity $\Omega 1$ is exerted, the detecting mass portions 22 and 23 are caused to be displaced and vibrated in the Z-axis direction. Consequently, the angular velocity $\Omega 1$ about the X-axis can be detected by detecting the vibrations of the detecting mass portions 22 and 23 with the displacement detecting portions 30 and 31.

On the other hand, when the angular velocity Ω2 about the Y-axis is exerted, the Coriolis force Fy acting in the Z-axis direction can be generated in each of the driven mass portions 6 and 7 vibrating in the X-axis direction. Thus, when the angular velocity Ω2 is exerted, the detecting mass portions 24 and 25 are caused to be displaced and vibrated in the Z-axis direction. Consequently, the angular velocity Ω2 about the Y-axis can be detected by detecting the vibrations of the detecting mass portions 24 and 25 with the displacement detecting portions 32 and 33. As a result, the angular velocities Ω1 and Ω2 acting about two axes (i.e., the X-axis and the Y-axis), which horizontally extend parallel or substantially parallel to the base plate 2, can be detected by using the single angular velocity sensor 1.

Further, since the four driven mass portions 4 to 7 are arranged at the point-symmetrical locations with respect to the central point O, adjacent two of the driven mass portions 4 to 7 in the circumferential direction are vibrated in opposite directions (opposite phases). Therefore, the position of the center of gravity of the driven mass portions 4 to 7 can be maintained, and rotating torques (rotational moments) generated in the four driven mass portions 4 to 7 in the circumferential direction can be canceled out. On that occasion, for example, even when processing or manufacturing variations are generated in the four driven mass portions 4 to 7, the driven mass portions 4 to 7 are vibrated in a state in which the amplitudes and the phases of their vibrations are matched with one another, because the coupling beam 8 interconnects the four driven mass portions 4 to 7. As a result, fluctuations in the location of the center of gravity and the rotating torque of the four driven mass portions 4 to 7 can be reliably reduced, and the vibrations of the driven mass portions 4 to 7 can be prevented from leaking to the base plate 2 in the driven state. Thus, an offset output of the angular velocity signal is stabilized.

Moreover, the driven mass portions 4 to 7 are supported using the driven beams 13 to 16 and the detecting mass portions 22 to 25 are supported using the detecting beams 26 to 29. Therefore, the driven mass portions 4 to 7 and the detecting mass portions 22 to 25 can be supported using separate beams (i.e., the driven beams 13 to 16 and the detecting beams 26 to 29), which are independent of one another, and coupling between the vibrations having been driven and the vibrations to be detected can be reduced as compared to the case of supporting the driven mass portions 4 to 7 and the detecting mass portions 22 to 25 using common beams. Accordingly, when the displacement detecting portions 30 to 33 detect the respective displacements of the detecting mass portions 22 to 25 and output the preliminary displacement detection signals Vs1 to Vs4, components of the driven vibrations which provide noise signals can be prevented from being mixed in the displacement detection signals Vs1 to Vs4. As a result, for example, when the displacement detection signals Vs1 to Vs4 are directly amplified or differentially amplified using the differential amplifiers 66 and 70, the gain can be prevented from being saturated with the noise signals. Thus, an amplification rate in an initial stage before the synchronous detection can be increased and a noise signal included in the angular velocity signal can be relatively reduced. In addition, the angular velocity signal with a high SN ratio can be obtained and the detection accuracy of the angular velocity sensor 1 can be improved.

The driven mass portions 4 to 7, the coupling beam 8, the connecting portions 9 to 12, the driven beams 13 to 16, and the detecting mass portions 22 to 25, which are movable portions, are configured in a point-symmetrical shape with respect to the central point O. Further, pairs of the driven mass portions 4 and 6 and the driven mass portions 5 and 7 are arranged at symmetrical locations with respect to the central point O and are vibrated in opposite directions to each other. Accordingly, when the angular velocities Ω1 and Ω2 are exerted, the detecting mass portions 22 and 24 and the detecting mass portions 23 and 25 are displaced in the Z-axis direction in an opposed relationship. Even when acceleration is exerted on the base plate 2 in the vertical direction (i.e., the Z-axis direction) to displace the detecting mass portions 22 to 25, changes of the electrostatic capacitances Cs1 to Cs4 in the displacement detecting portions 30 to 33, caused by those displacements of the detecting mass portions 22 to 25, are generated in the same or substantially the same values. Therefore, a component of the exerted acceleration can be removed from the angular velocity signal by differentially detecting the displacement detection signals Vs1 to Vs4 output from the displacement detecting portions 30 to 33.

Since the driven mass portions 4 to 7 and the detecting mass portions 22 to 25 themselves are not required to deform, the masses of the driven mass portions 4 to 7 and the detecting mass portions 22 to 25 can be increased so as to reduce their resonance frequencies. It is therefore possible to increase the displacements of the detecting mass portions 22 to 25, which are caused by the Coriolis forces Fx and Fy, and to improve the accuracy in detection of the angular velocities Ω1 and Ω2. Further, areas of the detecting mass portions 22 to 25 can be increased. As a result, even when the displacement detecting portions 30 to 33 are defined by the stationary-side detecting electrodes 30A to 33A which are arranged in an opposed relationship to the detecting mass portions 22 to 25 in the Z-axis direction, the changes of the electrostatic capacitances Cs1 to Cs4 caused by the displacements of the detecting mass portions 22 to 25 in the Z-axis direction can be increased, whereby the detection accuracy can be improved.

The four radially extending connecting portions 9 to 12 are connected to the coupling beam 8, and the driven beams 13 to 16 supporting the connecting portions 9 to 12 to be displaceable in the lengthwise direction thereof are disposed in the connecting portions 9 to 12, respectively. Therefore, even if distortions are generated in the base plate 2, those distortions can be absorbed by the driven beams 13 to 16. For example, the influence of a tensile force upon the coupling beam 8 can be reduced. As a result, the resonance frequencies of the driven mass portions 4 to 7 and the detecting mass portions 22 to 25 are less likely to change. It is therefore possible to reduce fluctuations in the characteristics and to stabilize an output of the angular velocity sensor 1.

Furthermore, in the first preferred embodiment, the detecting beams 26 to 29 are defined by torsional support beams that are caused to torsionally deform when the detecting mass portions 22 to 25 are displaced in the direction of thickness of the base plate 2. Accordingly, the torsional support beams can be formed by processing, e.g., a silicon material in the vertical direction of the base plate 2, and the processing can be easily performed. Because the torsional support beam is formed by a slender linear beam having a relatively small width, the detecting beams 26 to 29 tend to easily cause variations in their widths δ.

Even with the detecting beams 26 to 29 varying in their widths δ, because the coupling beam 8 and the driven beams 13 to 16, which determine the resonance frequencies of the driven mass portions 4 to 7, are also defined by similar slender beams, respective widths of the coupling beam 8, the driven beams 13 to 16, and the detecting beams 26 to 29 increase or decrease in a similar manner. As a result, respective spring constants of the coupling beam 8, the driven beams 13 to 16, and the detecting beams 26 to 29 also change in a similar manner, whereby the resonance frequency of the driven vibrations and the resonance frequency of the detected vibrations vary in a similar manner and amount. Thus, since the difference in the resonance frequency between the driven vibrations and the detected vibrations is not increased, the detection sensitivity can be prevented from being reduced due to the processing or manufacturing variations.

Since the driven mass portions 4 to 7 are arranged at intervals in the circumferential direction, the circumferential length of each of the driven mass portions 4 to 7 is less at the radially inner side than at the radially outer side. Further, since the detecting beams 26 to 29 are arranged at the radially outer sides of the driven mass portions 4 to 7, respective lengths of the detecting beams 26 to 29 extending in the circumferential direction can be increased as compared to the case of arranging the detecting beams 26 to 29 at the radially inner sides. Therefore, the degree of design freedom of the detecting beams 26 to 29 can be increased.

Still further, the detecting beams 26 to 29 are connected to the radially outer sides of the detecting mass portions 22 to 25 through the connection-purpose projecting portions 22A to 25A. Therefore, even when large driving torques are exerted on the radially outer sides of the detecting mass portions 22 to 25 with the driven vibrations, the detecting mass portions 22 to 25 and the driven mass portions 4 to 7 can be driven to vibrate together through the detecting beams 26 to 29.

Since the coupling beam 8 is disposed on the side close to the central point O surrounded by the four driven mass portions 4 to 7, the entire length of the coupling beam 8 can be reduced and the rigidity of the coupling beam 8 in the vertical direction of the base plate 2 (i.e., in the Z-axis direction) can be increased. Therefore, the driven mass portions 4 to 7 and the detecting mass portions 22 to 25 can be prevented from being displaced in the vertical direction of the base plate 2, and noises caused by the displacements of those mass portions 4 to 7 and 22 to 25 can be significantly reduced.

Since the vibration generating portions 17 to 20 are defined respectively by the movable-side driving electrodes 17A to 20A disposed on the driven mass portions 4 to 7 and the stationary-side driving electrodes 17B to 20B disposed on the base plate 2, the driven mass portions 4 to 7 can be directly displaced by electrostatic forces acting between the movable-side driving electrodes 17A to 20A and the stationary-side driving electrodes 17B to 20B. Thus, the driven mass portions 4 to 7 can be vibrated in the driven state.

Still further, the stationary-side detecting electrodes 30A to 33A of the displacement detecting portions 30 to 33 are electrically connected to the detecting lands 34, the stationary-side driving electrodes 17B to 20B of the vibration generating portions 17 to 20 are electrically connected to the driving lands 21, and the shield lands 40 are disposed between the driving lands 21 and the detecting lands 34. Therefore, coupling between the driving lands 21 and the detecting lands 34 can be blocked by the presence of the shield lands 40, and signal interference therebetween can be blocked. As a result, the driving signal Vd supplied to the vibration generating portions 17 to 20 is prevented from being mixed into the displacement detection signals Vs1 to Vs4 output from the displacement detecting portions 30 to 33. Thus, the accuracy in detection of the angular velocities $\Omega 1$ and $\Omega 2$ can be improved.

Since the vibration monitoring portions 35 to 38 are disposed so as to monitor respective displacements of the driven mass portions 4 to 7 in the directions of vibrations thereof, the amplitudes and the phases of the vibrations in the driven mass portions 4 to 7 can be detected using the vibration monitoring portions 35 to 38. Therefore, the monitoring signal Vm obtained from the vibration monitoring portions 35 to 38 can be utilized as a reference signal in the vibration control circuit 51, and the resonance state can be stabilized. The monitoring signal Vm obtained with the vibration monitoring portions 35 to 38 can also be utilized as a reference signal (phase shift signal Vm') in the angular velocity detection circuit 61, and the synchronous detection can be precisely performed depending on the vibration states of the driven mass portions 4 to 7.

In the first preferred embodiment, the vibration generating portions 17 to 20, the driving lands 21, the displacement detecting portions 30 to 33, the detecting land 34, the vibration monitoring portions 35 to 38, the monitoring lands 39, and the shield lands 40 are arranged in a symmetrical state. Therefore, even when the driving signal Vd and the monitoring signal Vm are mixed as noise signals into the displacement detection signals Vs1 to Vs4 output from the displacement detecting portions 30 to 33, all of those noise signals have the same or substantially the same level with respect to the displacement detection signals Vs1 to Vs4. Thus, the noise signals can be easily removed.

In the first preferred embodiment, the vibration monitoring portions 35 to 38 are preferably disposed in the driven mass portions 4 to 7 in a one-to-one relationship. However, the preferred embodiments of the present invention are not limited to such an arrangement. For example, the vibration monitoring portion may be disposed in one, two or three among the four driven mass portions 4 to 7.

In the first preferred embodiment, since the vibration generating portions 17 to 20 and the vibration monitoring portions 35 to 38 have the same or substantially the same shapes, the vibration monitoring portions can also be used as the vibration generating portions. In such a case, the driving forces applied to the driven mass portions can be increased.

Figure 12:
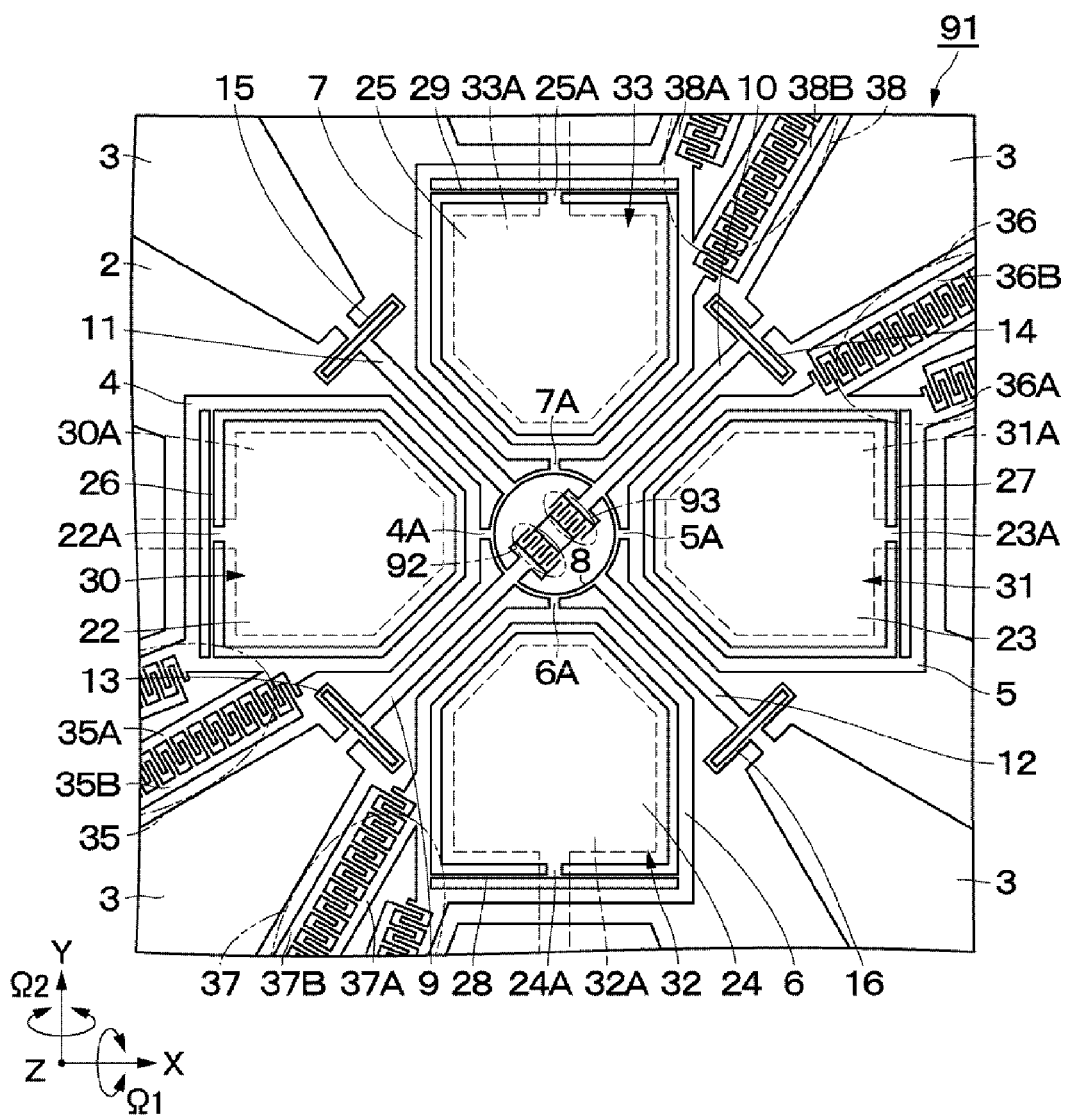
FIG. 12 is a plan view of an angular velocity sensor according to a second preferred embodiment of the present invention, the view illustrating, in enlarged scale, a principal portion of the angular velocity sensor in a similar area to that in FIG. 2.
Figure 13:
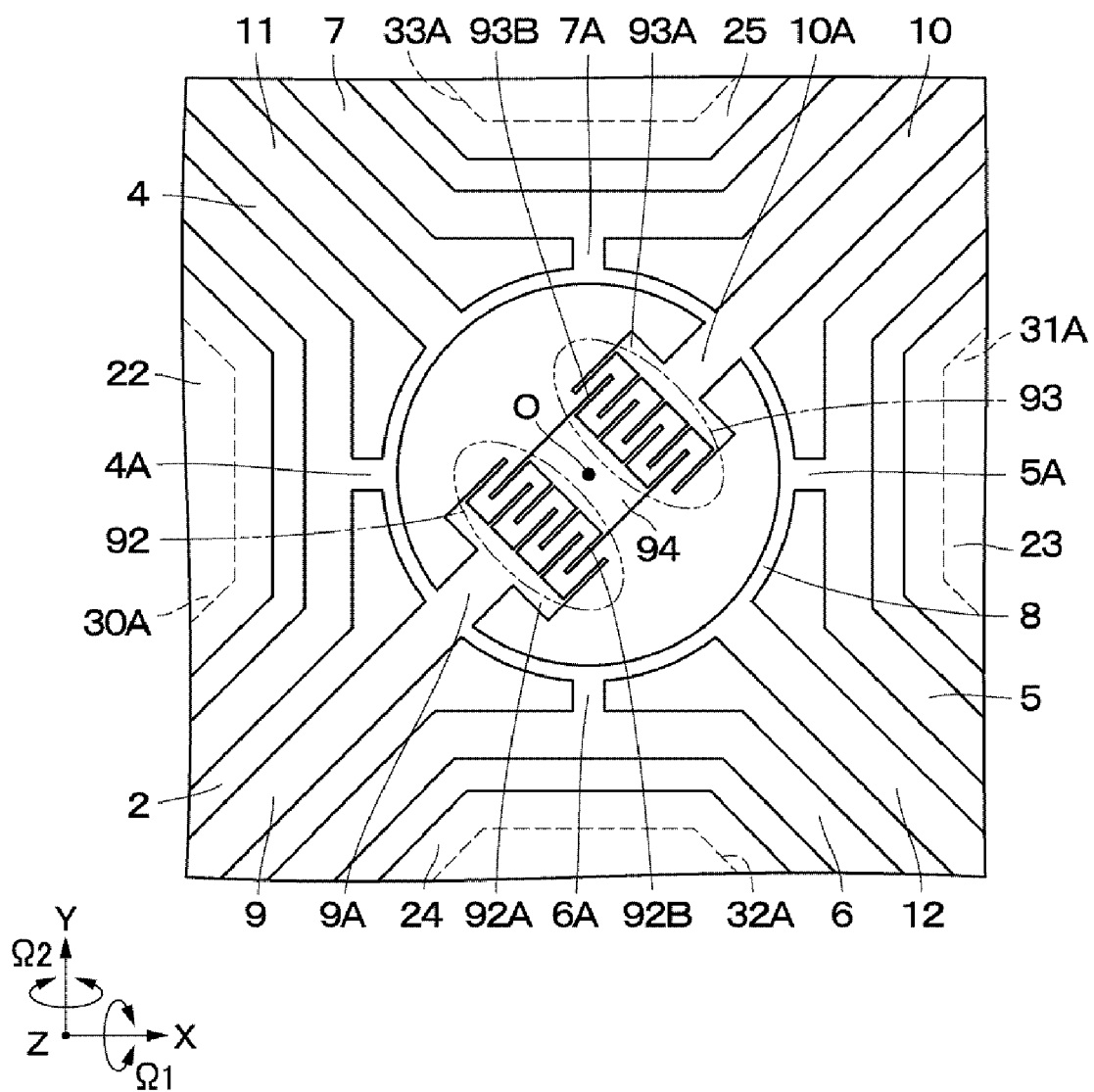
FIG. 13 is a plan view illustrating, in enlarged scale, vibration generating portions in FIG. 12.
Figure 14:
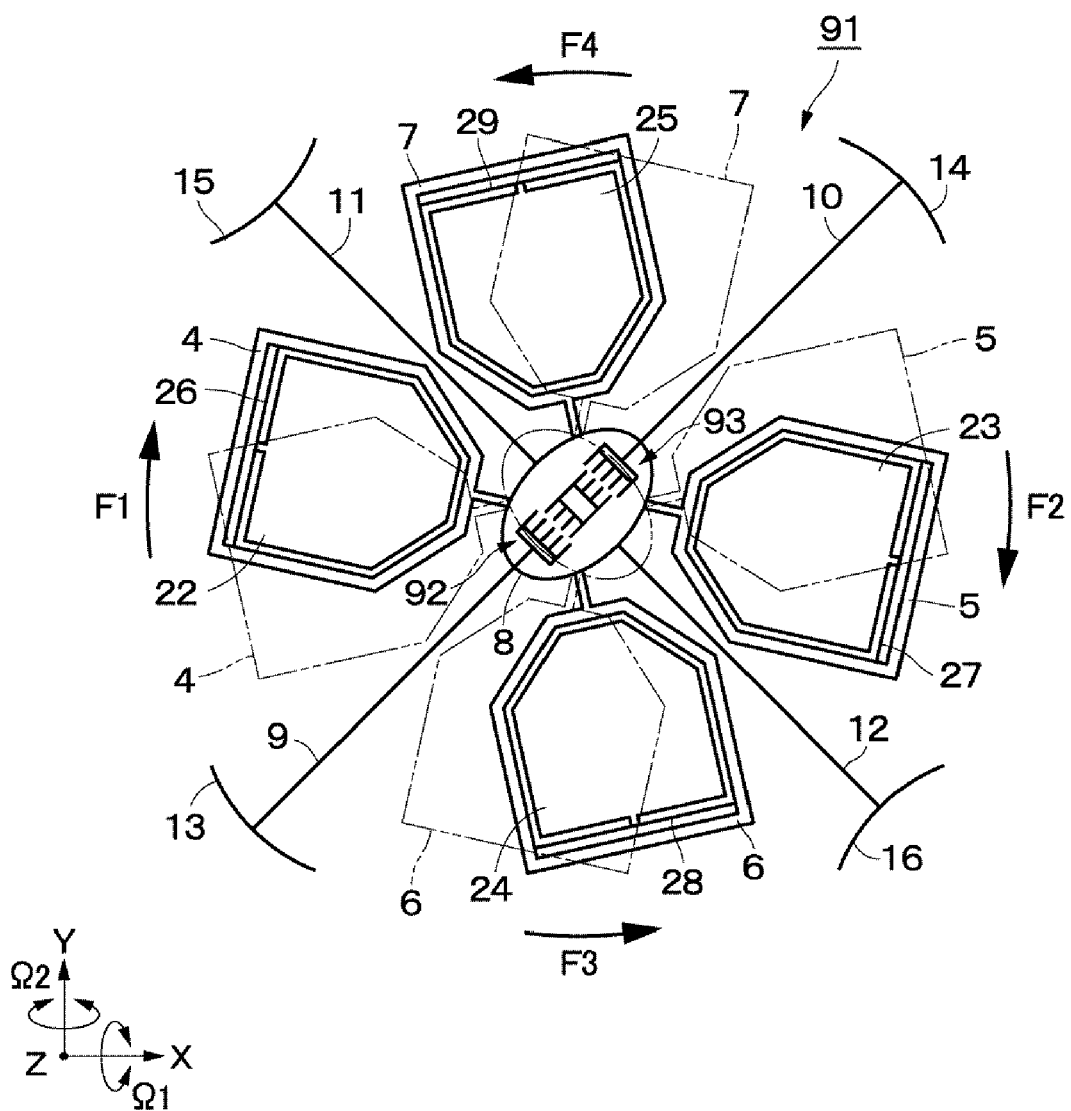
FIG. 14 is an explanatory view illustrating the angular velocity sensor according to the second preferred embodiment in a state in which driven mass portions are vibrated.

FIGS. 12 to 14 illustrate a second preferred embodiment of the present invention. The second preferred embodiment includes a vibration generating portion that is defined by a movable-side driving electrode disposed in connection to the coupling beam and a stationary-side driving electrode disposed on the base plate in an opposed relationship to the movable-side driving electrode. It is noted that the same components in the second preferred embodiment as those in the first preferred embodiment are denoted by the same characters and descriptions of those components are omitted.

Similar to the angular velocity sensor 1, an angular velocity sensor 91 includes the base plate 2, the driven mass portions 4 to 7, the coupling beam 8, the driven beams 13 to 16, vibration generating portions 92 and 93, the detecting mass portions 22 to 25, the detecting beams 26 to 29, the displacement detecting portions 30 to 33, and the vibration monitoring portions 35 to 38.

The vibration generating portions 92 and 93 are located near the central point O and are arranged inside the coupling beam 8. Similar to the vibration generating portions 17 to 20 in the first preferred embodiment, each of the vibration generating portions 92 and 93 is preferably made of, e.g., a silicon material having low resistance. Further, the vibration generating portions 92 and 93 are respectively defined by movable-side driving electrodes 92A and 93A attached to the coupling beam 8 and stationary-side driving electrodes 92B and 93B attached to an electrode support portion 94 on the base plate 2.

The electrode support portion 94 is surrounded by the coupling beam 8 and is fixed near the central point O of the base plate 2. The movable-side driving electrodes 92A and 93A are attached to respective tip ends of extended portions 9A and 10A, which are formed by extending the connecting portions 9 and 10 inward in the radial direction. Each of the movable-side driving electrodes 92A and 93A is preferably defined by a comb-shaped electrode having a plurality of electrode plates. The stationary-side driving electrodes 92B and 93B are attached to peripheries of the electrode support portion 94 in an opposed relationship to the movable-side driving electrodes 92A and 93A. Each of the stationary-side driving electrodes 92B and 93B is also defined by a comb-shaped electrode having a plurality of electrode plates. Further, the movable-side driving electrodes 92A and 93A and the stationary-side driving electrodes 92B and 93B are preferably disposed in an interdigitated state such that the opposed electrodes move towards and away from each other by electrostatic forces acting when a driving signal is applied to the electrode support portion 94. As a result, the vibration generating portions 92 and 93 cause the coupling beam 8 to flexurally deform by the electrostatic forces acting between the movable-side driving electrodes 92A and 93A and the stationary-side driving electrodes 92B and 93B, thereby indirectly vibrating the driven mass portions 4 to 7.

The second preferred embodiment provides substantially the same operating advantages as those of the first preferred embodiment. According to the second preferred embodiment, in particular, since the vibration generating portions 92 and 93 are defined by the movable-side driving electrodes 92A and 93A and the stationary-side driving electrodes 92B and 93B, the coupling beam 8 can be flexurally deformed by the electrostatic forces acting between the movable-side driving electrodes 92A and 93A and the stationary-side driving electrodes 92B and 93B. As a result, the driven mass portions 4 to 7 connected to the coupling beam 8 can be indirectly displaced so that the driven mass portions 4 to 7 can be vibrated in the driven state.

Further, since the vibration generating portions 92 and 93 are not required to be disposed around the driven mass portions 4 to 7, the sizes of the driven mass portions 4 to 7 and the detecting mass portions 22 to 25 can be increased so as to improve the detection accuracy of the angular velocities Ω1 and Ω2. On the other hand, with the arrangement in which the vibration generating portions 92 and 93 are not disposed around the driven mass portions 4 to 7, the overall size of the angular velocity sensor 91 can be reduced and the manufacturing cost can be reduced.

Even if electrical crosstalk occurs between the vibration generating portions 92, 93 and the displacement detecting portions 30 to 33 due to, e.g., capacitive coupling therebetween, the electrical crosstalk can be generated in a symmetrical state at a minimum. As a result, noises mixed into the displacement detection signals Vs1 to Vs4 can be reduced.

Further, since the stationary-side driving electrodes 92B and 93B need to be connected to the external circuit (i.e., the vibration control circuit 51) at only one location in the central portion (at the central point O) of the base plate 2, the number of terminals for connection to the external circuit can be reduced. Accordingly, the overall size of the angular velocity sensor 91 can be reduced and the manufacturing cost can be reduced.

In the second preferred embodiment, the displacements of the driven mass portions 4 to 7 in the directions of vibrations thereof are preferably monitored using the vibration monitoring portions 35 to 38 which are located outside the coupling beam 8 and which are attached to the peripheries of the driven mass portions 4 to 7. However, preferred embodiments of the present invention are not limited to such an arrangement. For example, the vibration monitoring portions may be disposed inside the coupling beam. In such a case, the vibration monitoring portions are configured similarly to, e.g., the vibration generating portions 92 and 93 so as to detect the electrostatic capacitances between movable-side monitoring electrodes disposed in connection to the coupling beam and stationary-side monitoring electrodes disposed on the base plate.

Figure 15:
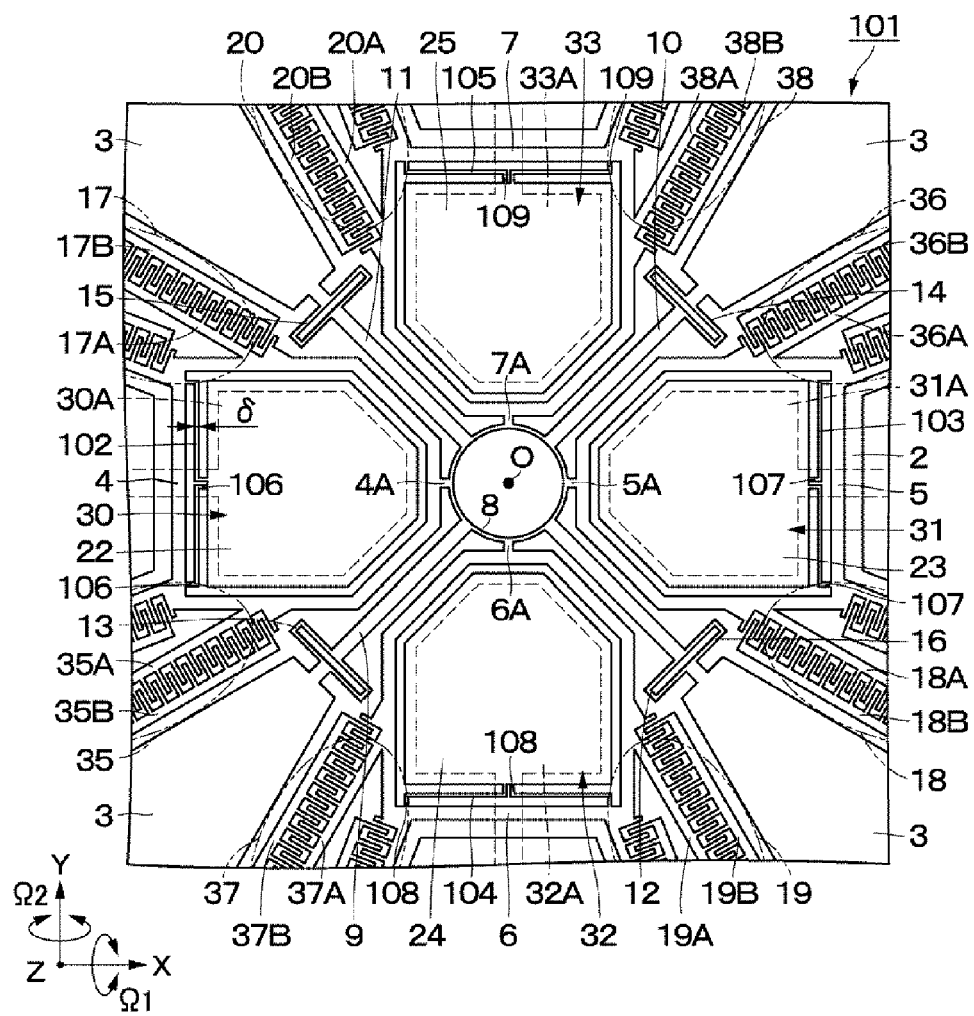
FIG. 15 is a plan view of an angular velocity sensor according to a third preferred embodiment of the present invention, the view illustrating, in enlarged scale, a principal portion of the angular velocity sensor in a similar area to that in FIG. 2.
Figure 16:
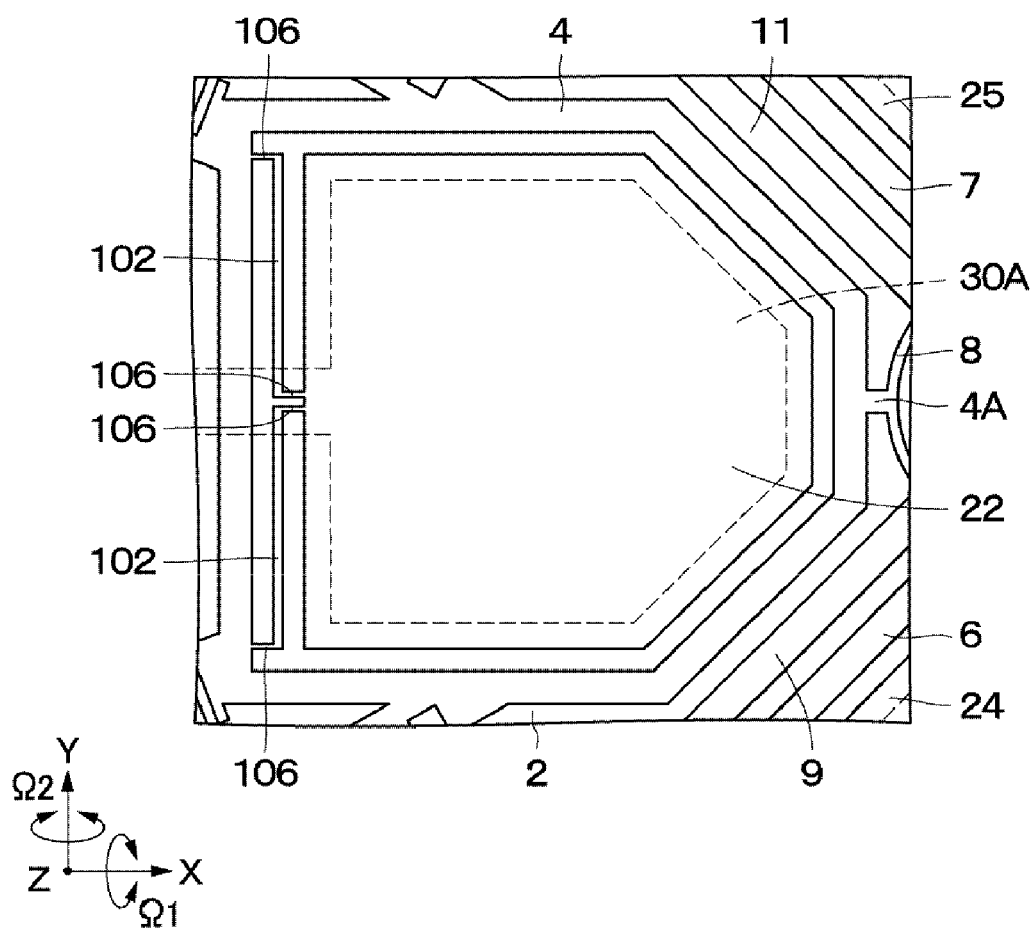
FIG. 16 is a plan view illustrating, in enlarged scale, a detecting beam, etc.

FIGS. 15 and 16 illustrate a third preferred embodiment of the present invention. The third preferred embodiment includes opposite ends of a detecting beam that are connected to the detecting mass portion and the driven mass portion through stress reduction connecting portions. It is noted that the same components in the third preferred embodiment as those in the first preferred embodiment are denoted by the same characters and descriptions of those components are omitted.

Similar to the angular velocity sensor 1 according to the first preferred embodiment, an angular velocity sensor 101 includes the base plate 2, the driven mass portions 4 to 7, the coupling beam 8, the driven beams 13 to 16, the vibration generating portions 17 to 20, the detecting mass portions 22 to 25, detecting beams 102 to 105, the displacement detecting portions 30 to 33, and the vibration monitoring portions 35 to 38.

The detecting beams 102 to 105 are arranged outside the detecting mass portions 22 to 25 in the radial direction and are disposed between the detecting mass portions 22 to 25 and the driven mass portions 4 to 7. The detecting beams 102 to 105 support the detecting mass portions 22 to 25 to be displaceable in the direction of thickness of the base plate 2. Further, the detecting beams 102 to 105 are defined by torsional support beams, which extend in the circumferential direction about the central point O and which torsionally deform when the detecting mass portions 22 to 25 are displaced in the direction of thickness of the base plate 2. In practice, each of the detecting beams 102 to 105 is preferably defined by a slender plate-shaped beam having a width δ and extending linearly. In addition, radially inner ends of the detecting mass portions 22 to 25, which are located closer to the central point O, define free ends and the detecting beams 102 to 105 respectively support the detecting mass portions 22 to 25 in a cantilevered state.

However, the detecting beams 102 to 105 differ from the detecting beams 26 to 29 in the first preferred embodiment in that each of the detecting beams 102 to 105 are disposed in a pair for the detecting mass portions 22 to 25, respectively. More specifically, two detecting beams 102 are located inside the driven mass portion 4 while extending in the Y-axis direction such that they are arranged so as to be disposed opposite to one another on a line in the Y-axis direction. Similarly, two detecting beams 103 are located inside the driven mass portion 5 while extending in the Y-axis direction such that they are arranged so as to be disposed opposite to one another on a line in the Y-axis direction.

Two detecting beams 104 are located inside the driven mass portion 6 while extending in the X-axis direction such that they are arranged so as to be disposed opposite to one another on a line in the X-axis direction. Similarly, two detecting beams 105 are located inside the driven mass portion 7 while extending in the X-axis direction such that they are arranged so as to be disposed opposite to one another on a line in the X-axis direction.

One end side of each detecting beam 102 is located in a central area of the detecting mass portion 22 in the Y-axis direction and is connected to the detecting mass portion 22 by an L-shaped beam 106 that define the stress reduction connecting portion. The other end side of each detecting beam 102 is located in each of opposite end areas of the detecting mass portion 22 in the Y-axis direction and is connected to the driven mass portion 4 by another L-shaped beam 106.

Similarly, one end side of each detecting beam 103 is located in a central area of the detecting mass portion 23 in the Y-axis direction and is connected to the detecting mass portion 23 by an L-shaped beam 107 that defines the stress reduction connecting portion. The other end side of each detecting beam 103 is located in each of opposite end areas of the detecting mass portion 23 in the Y-axis direction and is connected to the driven mass portion 5 by another L-shaped beam 107.

Further, one end side of each detecting beam 104 is located in a central area of the detecting mass portion 24 in the X-axis direction and is connected to the detecting mass portion 24 by an L-shaped beam 108 that defines the stress reduction connecting portion. The other end side of each detecting beam 104 is located in each of opposite end areas of the detecting mass portion 24 in the X-axis direction and is connected to the driven mass portion 6 by another L-shaped beam 108.

Similarly, one end side of each detecting beam 105 is located in a central area of the detecting mass portion 25 in the X-axis direction and is connected to the detecting mass portion 25 by an L-shaped beam 109 that defines the stress reduction connecting portion. The other end side of each detecting beam 105 is located in each of opposite end areas of the detecting mass portion 25 in the X-axis direction and is connected to the driven mass portion 7 by another L-shaped beam 109.

The L-shaped beams 106 and 107 are preferably bent into the L-shape starting from the detecting beams 102 and 103, for example. Therefore, the opposite end sides of each of the detecting beams 102 and 103 are supported in a state having a degree of freedom in the Y-axis direction, i.e., in the lengthwise direction thereof. Similarly, the L-shaped beams 108 and 109 are preferably bent into the L-shape starting from the detecting beams 104 and 105, for example. Therefore, the opposite end sides of each of the detecting beams 104 and 105 are supported in a state having a degree of freedom in the X-axis direction, i.e., in the lengthwise direction thereof. As a result, when the detecting beams 102 to 105 are torsionally deformed, the opposite end sides of each of the detecting beams 102 to 105 are allowed to displace in the lengthwise direction thereof. Thus, distortions and stresses acting on the opposite end sides of each of the detecting beams 102 to 105 can be reduced.

The third preferred embodiment provides substantially the same operating advantages as those of the first preferred embodiment. According to the third preferred embodiment, in particular, since the respective opposite end sides of each of the detecting beams 102 to 105 are connected to the detecting mass portions 22 to 25 and the driven mass portions 4 to 7 through the L-shaped beams 106 to 109, fluctuations in sensitivity of the angular velocity sensor 101 can be reduced.

The relationship between the L-shaped beams 106 to 109 and fluctuations in the sensitivity will be described in detail below. First, when the opposite ends of each of the detecting beams 26 to 29 are fixed as in the first preferred embodiment, torsional deformations of the detecting beams 26 to 29 are prevented by stresses acting on the fixed portions of the detecting beams 26 to 29. Therefore, when the thickness of each of the detecting beams 26 to 29 is changed, a change of the resonance frequency corresponding to the change of the thickness is increased. As a result, the processing or manufacturing variations tend to increase the influence upon the difference in the resonance frequency between a driving mode and a detection mode.

In contrast, according to the third preferred embodiment, since the opposite end sides of each of the detecting beams 102 to 105 are connected to the detecting mass portions 22 to 25 and the driven mass portions 4 to 7 through the L-shaped beams 106 to 109, it is possible to reduce distortions and stresses acting on the opposite end sides of each of the detecting beams 102 to 105 when the detecting beams 102 to 105 are torsionally deformed. As a result, the influence of the processing or manufacturing variations in the thickness of the detecting beams upon the difference in the resonance frequency between the driving mode and the detection mode can be reduced, and the fluctuations in the sensitivity of the angular velocity sensor 101 can be reduced.

Figure 17:
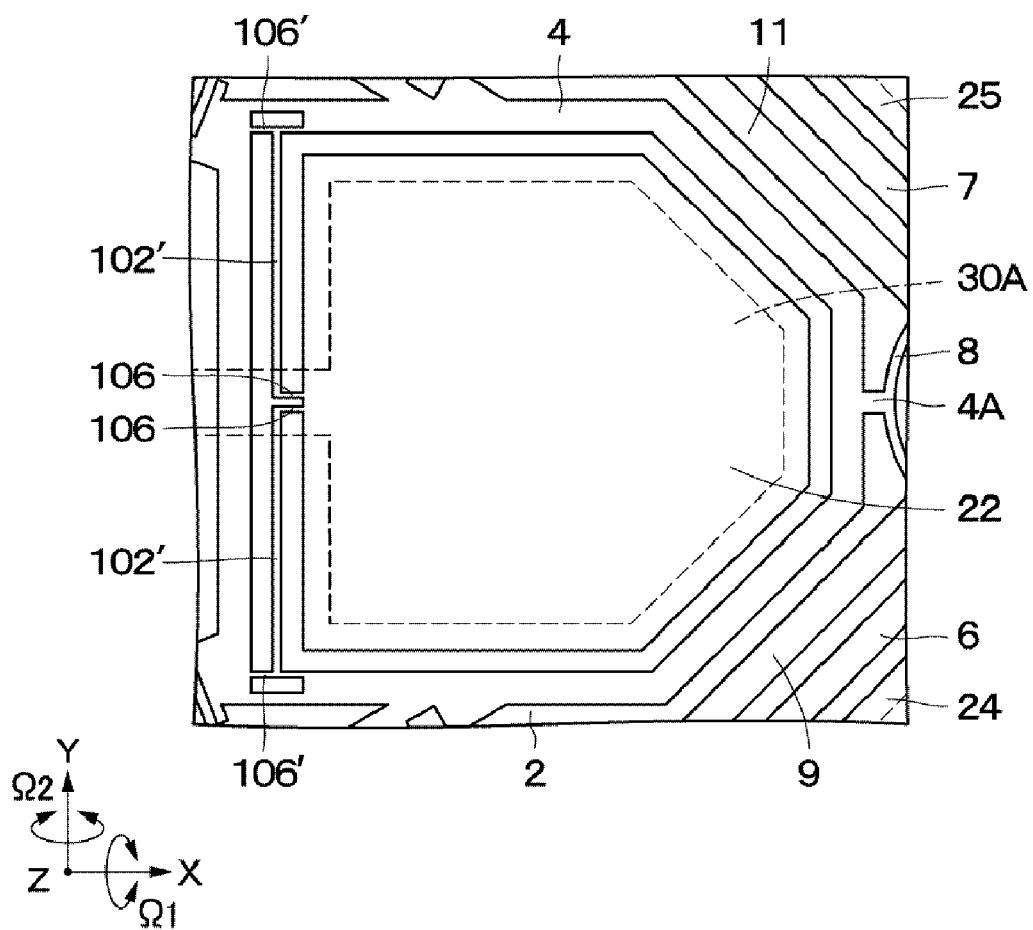
FIG. 17 is a plan view illustrating, in enlarged scale, a detecting beam according to a first modification in a similar area to that in FIG. 16.

In the third preferred embodiment, the stress reduction connecting portions are preferably constituted by using the L-shaped beams 106 to 109. However, preferred embodiments of the present invention are not limited to such a configuration, and the stress reduction connecting portion is only required to provide a degree of freedom in the lengthwise direction of the detecting beam (i.e., in the direction of a torsion axis). Therefore, as a first modification illustrated in FIG. 17, the stress reduction connecting portion may preferably be defined, for example, by using a T-shaped beam 106' that provides a T-shaped end at the outer end side of a detecting beam 102'.

Figure 18:
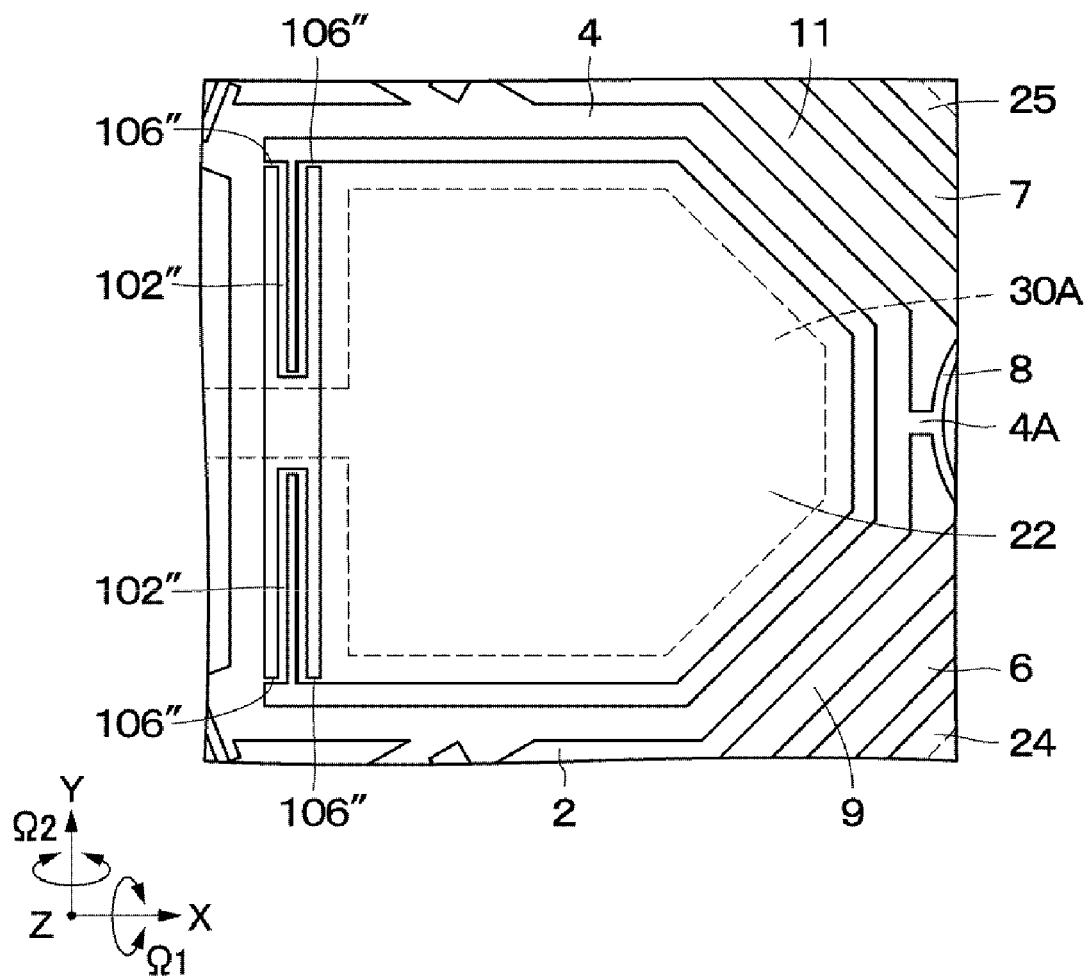
FIG. 18 is a plan view illustrating, in enlarged scale, a detecting beam according to a second modification in a similar area to that in FIG. 16.

Further, in the third preferred embodiment, the detecting beams 102 to 105 are each preferably defined by the torsional support beam extending linearly. However, preferred embodiments of the present invention are not limited to such a configuration. For example, as in a second modification illustrated in FIG. 18, a detecting beam 102" may preferably be defined by a torsional support beam that has a shape obtained by folding a linear beam one or several times, for example.

In the above-described preferred embodiments, the detecting beams 26 to 29 and 102 to 105 are preferably defined by the torsional support beams that are caused to torsionally deform when the detecting mass portions 22 to 25 are displaced in the direction of thickness of the base plate 2. However, preferred embodiments of the present invention are not limited to such a configuration. For example, the detecting beam may be defined by a flexible support beam that is caused to flexurally deform when the detecting mass portion is displaced in the direction of thickness of the base plate.

Figure 19:
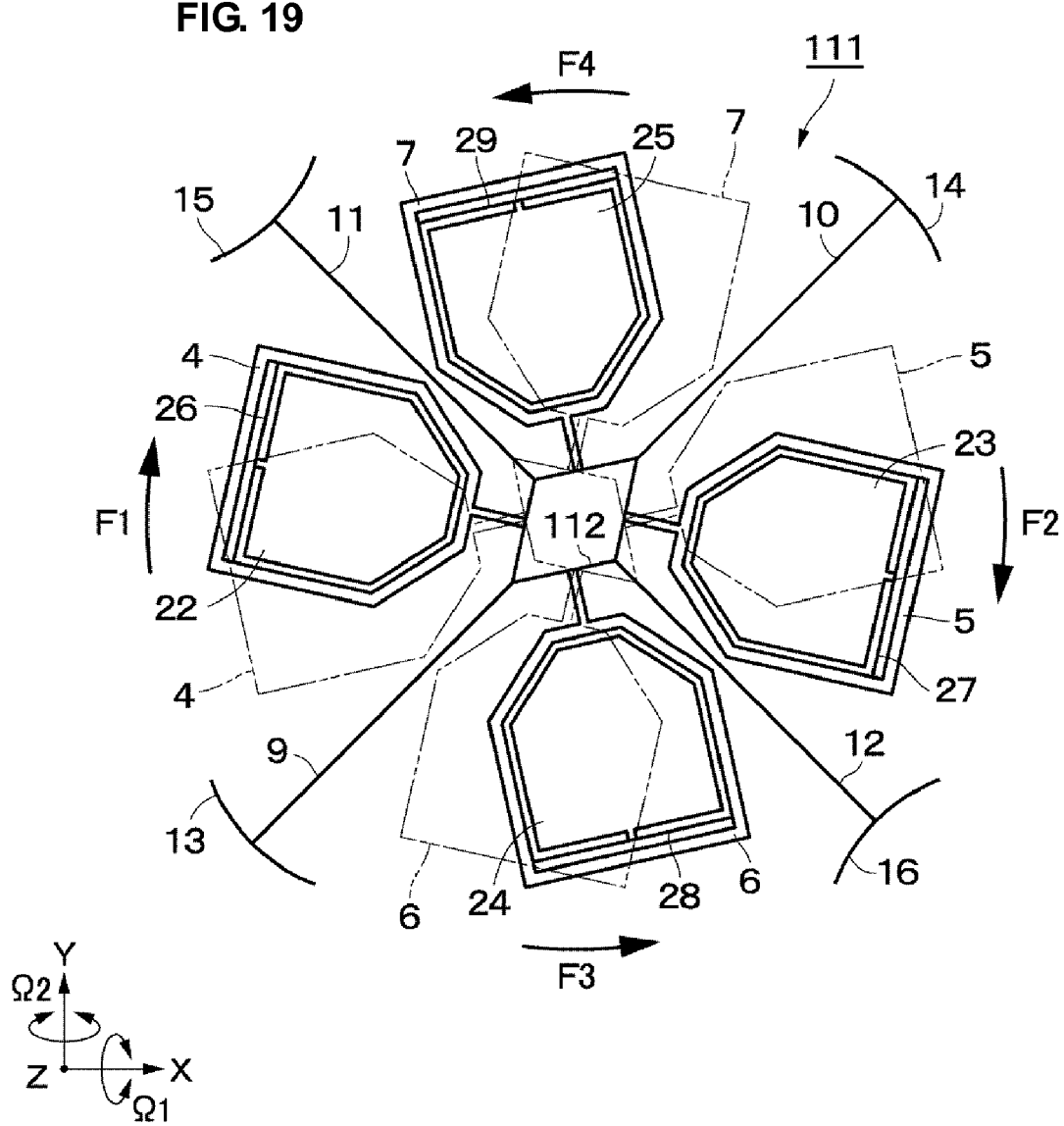
FIG. 19 is an explanatory view illustrating an angular velocity sensor according to a third modification.

In the above-described preferred embodiments, the coupling beam 8 preferably has a circular frame shape. However, preferred embodiments of the present invention are not limited to such a configuration. For example, a coupling beam 112 in the shape of a rectangular frame may be used as in an angular velocity sensor 111 according to a third modification illustrated in FIG. 19. Alternatively, the coupling beam may have the shape of a pentagonal or other polygonal frame. In such a case, the coupling beam preferably has the shape of a polygonal frame having a certain number of inner angles that is a multiple of 4, such as an octagonal or dodecagonal frame, for example.

Figure 20:
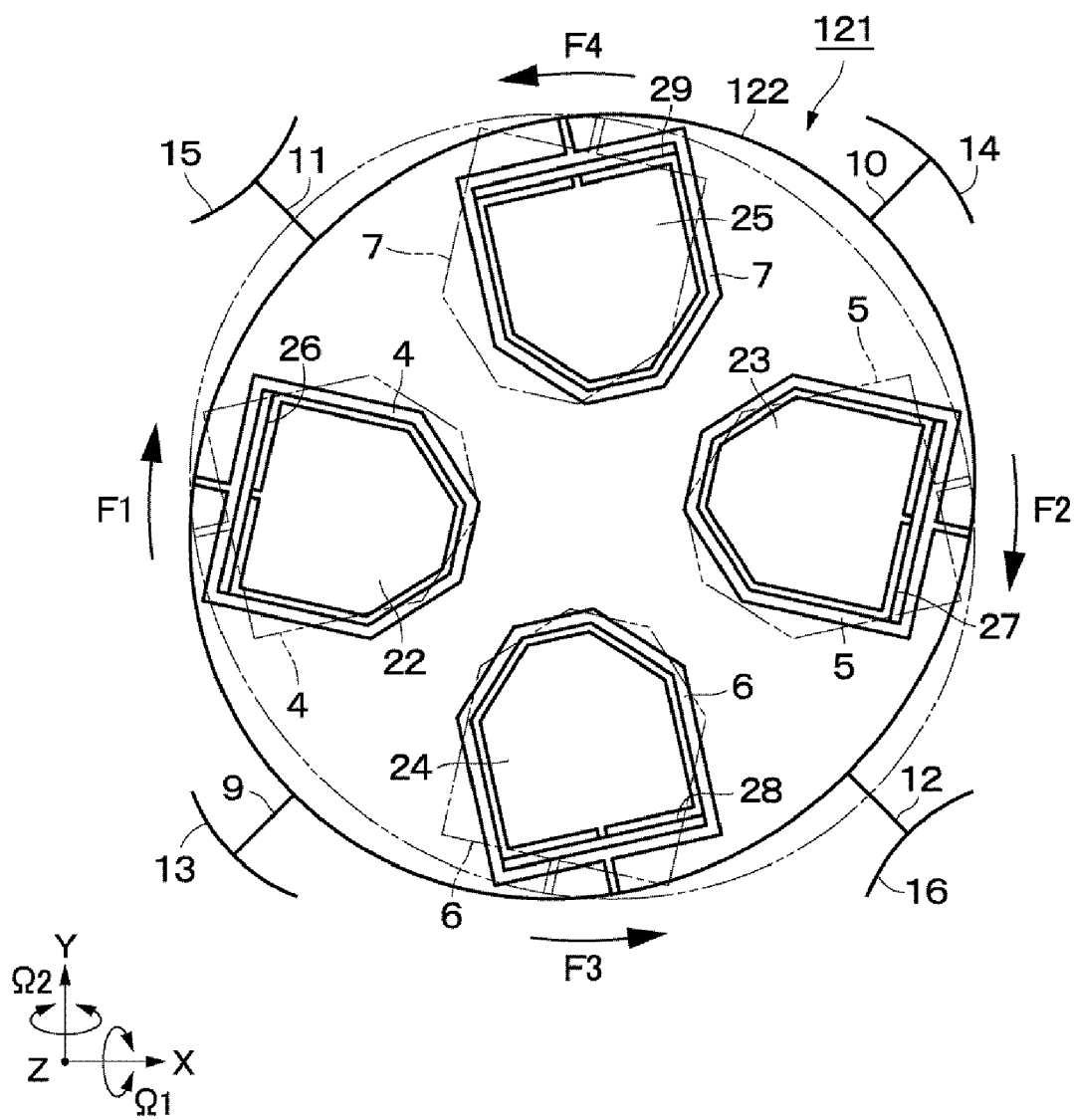
FIG. 20 is an explanatory view illustrating an angular velocity sensor according to a fourth modification.

In the above-described preferred embodiments, the coupling beam 8 is preferably disposed on the side near the central point O surrounded by the driven mass portions 4 to 7 (i.e., on the inner side in the radial direction). However, preferred embodiments of the present invention are not limited to such an arrangement. For example, a coupling beam 122 may be disposed on the outer side in the radial direction so as to surround the driven mass portions 4 to 7 as in an angular velocity sensor 121 according to a fourth modification illustrated in FIG. 20.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An angular velocity sensor comprising:
    a base plate;
    four driven mass portions arranged to face the base plate with gaps provided therebetween and arranged at different locations in a circumferential direction about a central portion and which are point-symmetrical with respect to the central portion;
    a coupling beam interconnecting the four driven mass portions and flexurally deforming when the four driven mass portions are displaced in a horizontal direction parallel or substantially parallel to the base plate;
    four connecting portions extending radially about the central portion, each arranged between two adjacent ones of the driven mass portions in the circumferential direction, and connected to the coupling beam;
    driven beams disposed respectively in the four connecting portions and supporting the connecting portions to be displaceable in a lengthwise direction thereof when the coupling beam is flexurally deformed;
    driving elements arranged to vibrate the four driven mass portions in the circumferential direction about the central portion in a state in which two adjacent ones of the driven mass portions in the circumferential direction are vibrated in opposite phases;
    detecting mass portions disposed respectively in the four driven mass portions;
    detecting beams disposed between the detecting mass portions and the driven mass portions and supporting the detecting mass portions to be displaceable in a direction of thickness of the base plate; and
    displacement detecting elements arranged to detect displacements of the detecting mass portions in the direction of thickness of the base plate.

2. The angular velocity sensor according to claim 1, wherein the detecting beams are defined by torsional support beams which extend in the circumferential direction about the central portion and which torsionally deform when the detecting mass portions are displaced in the direction of thickness of the base plate.

3. The angular velocity sensor according to claim 2, wherein the detecting beams are connected to the detecting mass portions and the driven mass portions through stress reduction connecting portions which reduce stresses acting on end sides of the detecting mass portions when the detecting mass portions are torsionally deformed.

4. The angular velocity sensor according to claim 1, wherein the coupling beam is disposed on a side adjacent to the central portion surrounded by the four driven mass portions.

5. The angular velocity sensor according to claim 1, wherein the driving elements includes movable-side driving electrodes disposed in the driven mass portions and stationary-side driving electrodes disposed on the base plate in an opposed relation to the movable-side driving electrodes, and the driven mass portions are vibrated by electrostatic forces acting between the movable-side driving electrodes and the stationary-side driving electrodes.

6. The angular velocity sensor according to claim 5, wherein
    the displacement detecting elements include stationary-side detecting electrodes disposed in an opposed relationship to the detecting mass portions in the direction of the thickness;
    the stationary-side detecting electrodes of the displacement detecting elements are electrically connected to detecting lands disposed on the base plate;
    the stationary-side driving electrodes of the driving elements are electrically connected to driving lands disposed on the base plate; and
    shield lands are disposed between the driving lands and the detecting lands to block signal interference.

7. The angular velocity sensor according to claim 1, wherein the driving elements include movable-side driving electrodes disposed in connection to the coupling beam and stationary-side driving electrodes disposed on the base plate in an opposed relationship to the movable-side driving electrodes, and the driven mass portions are vibrated by causing the coupling beam to flexurally deform with electrostatic forces acting between the movable-side driving electrodes and the stationary-side driving electrodes.

8. The angular velocity sensor according to claim 1, wherein
    monitoring elements arranged to monitor displacements of the driven mass portions in directions of vibrations thereof are disposed around the driven mass portions; and
    the monitoring elements include movable-side monitoring electrodes disposed in the driven mass portions and stationary-side monitoring electrodes disposed on the base plate in an opposed relation to the movable-side monitoring electrodes, and detect the displacements of the driven mass portions based on electrostatic capacitances between the movable-side monitoring electrodes and the stationary-side monitoring electrodes.

* * * * *

UNITED STATES PATENT AND TRADEMARK OFFICE
CERTIFICATE OF CORRECTION

PATENT NO. : 8,272,267 B2
APPLICATION NO. : 12/830515
DATED : September 25, 2012
INVENTOR(S) : Masaya Tamura et al.

Page 1 of 1

It is certified that error appears in the above-identified patent and that said Letters Patent is hereby corrected as shown below:

Title Page

Related U.S. Application Data

Insert Item --(63) Continuation of Application No. PCT/JP2008/072656, filed on December 12, 2008.--

Signed and Sealed this
Twenty-first Day of May, 2013

Teresa Stanek Rea
*Acting Director of the United States Patent and Trademark Office*